US012125350B2

(12) United States Patent
Boese

(10) Patent No.: US 12,125,350 B2
(45) **Date of Patent: *Oct. 22, 2024**

(54) GAMING MACHINES AND METHOD FOR INCREASED RETURN TO PLAYER MODE

(71) Applicant: Aristocrat Technologies, Inc., Las Vegas, NV (US)

(72) Inventor: Eric Boese, Decatur, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,763

(22) Filed: Apr. 14, 2023

(65) Prior Publication Data

US 2023/0252855 A1 Aug. 10, 2023

Related U.S. Application Data

(63) Continuation of application No. 17/006,059, filed on Aug. 28, 2020, now Pat. No. 11,651,654.

(60) Provisional application No. 62/893,590, filed on Aug. 29, 2019.

(51) Int. Cl.

*G07F 17/32* (2006.01)
*G07F 17/34* (2006.01)

(52) U.S. Cl.

CPC ...... *G07F 17/3267* (2013.01); *G07F 17/3213* (2013.01); *G07F 17/3225* (2013.01); *G07F 17/3244* (2013.01); *G07F 17/34* (2013.01)

(58) Field of Classification Search

CPC ............. G07F 17/3267; G07F 17/3213; G07F 17/3225; G07F 17/3244

See application file for complete search history.

(56) References Cited

U.S. PATENT DOCUMENTS

| | | | | | |
|---|---|---|---|---|---|
| 10,818,140 | B2 * | 10/2020 | Halvorson | G07F 17/3244 | |
| 11,183,018 | B2 * | 11/2021 | Marks | G07F 17/329 | |
| 11,651,654 | B2 * | 5/2023 | Boese | G07F 17/3213 | 463/20 |
| 2005/0075163 | A1 * | 4/2005 | Cuddy | G07F 17/3267 | 463/20 |
| 2006/0025201 | A1 * | 2/2006 | Van Asdale | G07F 17/32 | 463/20 |
| 2008/0119282 | A1 * | 5/2008 | Bennett | G07F 17/34 | 463/43 |
| 2009/0124346 | A1 * | 5/2009 | Baerlocher | G07F 17/3258 | 463/20 |

(Continued)

OTHER PUBLICATIONS

Office Action (Final Rejection) dated Sep. 2, 2022 for U.S. Appl. No. 17/006,059 (pp. 1-17).

(Continued)

*Primary Examiner* — Chase E Leichliter

(74) *Attorney, Agent, or Firm* — Armstrong Teasdale LLP

(57) ABSTRACT

Various systems and methods for providing an enhanced return to player (RTP) mode is provided. During play of a base game, certain tracking elements are collected over a number of plays. After a predetermined quantity of elements are collected, play of the enhanced RTP mode begins. For the play of the enhanced RTP mode, a wager is required. A quantity of plays of the enhanced RTP mode is provided that matches the quantity of tracking elements accumulated to trigger the mode.

17 Claims, 19 Drawing Sheets

(56) References Cited

U.S. PATENT DOCUMENTS

| | | | | |
|---|---|---|---|---|
| 2009/0239649 | A1* | 9/2009 | Yoshizawa | G07F 17/3216 463/20 |
| 2010/0016071 | A1* | 1/2010 | Jaffe | G07F 17/3258 463/27 |
| 2010/0120525 | A1* | 5/2010 | Baerlocher | G07F 17/32 463/29 |
| 2011/0028202 | A1* | 2/2011 | Naicker | G07F 17/3244 463/20 |
| 2011/0117989 | A1* | 5/2011 | Kennedy | G07F 17/34 463/20 |
| 2011/0294561 | A1* | 12/2011 | Shaw | G07F 17/3295 463/16 |
| 2014/0018146 | A1* | 1/2014 | Zielinski | G07F 17/3267 463/20 |
| 2014/0162751 | A1* | 6/2014 | Ryan | G07F 17/3267 463/20 |
| 2014/0370961 | A1* | 12/2014 | Elias | G07F 17/3267 463/20 |
| 2015/0161853 | A1* | 6/2015 | Ryan | G07F 17/34 463/20 |
| 2016/0042597 | A1* | 2/2016 | Olive | G07F 17/3262 463/21 |
| 2017/0024957 | A1* | 1/2017 | Boese | G07F 17/3213 |
| 2017/0154498 | A1* | 6/2017 | Olive | G07F 17/3267 |
| 2017/0193756 | A1* | 7/2017 | Schmidt | G07F 17/34 |
| 2018/0075708 | A1* | 3/2018 | San | G07F 17/3206 |
| 2018/0082535 | A1* | 3/2018 | Filipour | G07F 17/3209 |
| 2018/0261045 | A1* | 9/2018 | Takahara | G07F 17/3267 |
| 2018/0268659 | A1* | 9/2018 | Chesworth | G07F 17/3267 |
| 2019/0051099 | A1* | 2/2019 | Pawloski | G07F 17/3211 |
| 2019/0102977 | A1* | 4/2019 | Adair | G07F 17/3267 |
| 2019/0102994 | A1* | 4/2019 | Riggs | G07F 17/3225 |
| 2019/0139372 | A1* | 5/2019 | Berman | G07F 17/3244 |
| 2019/0188964 | A1* | 6/2019 | San | G07F 17/3213 |
| 2020/0074784 | A1* | 3/2020 | Caputo | G07F 17/3213 |
| 2020/0074785 | A1* | 3/2020 | Uss | G07F 17/3258 |
| 2020/0234541 | A1* | 7/2020 | Pierer | G07F 17/3267 |
| 2020/0250923 | A1* | 8/2020 | Ceniceroz | G07F 17/34 |
| 2020/0402347 | A1* | 12/2020 | Pierer | G07F 17/34 |
| 2021/0043038 | A1* | 2/2021 | Marks | G07F 17/329 |
| 2021/0065512 | A1* | 3/2021 | Boese | G07F 17/3213 |
| 2023/0252855 | A1* | 8/2023 | Boese | G07F 17/3267 463/20 |

OTHER PUBLICATIONS

Office Action (Notice of Allowance and Fees Due (PTOL-85)) dated Jan. 4, 2023 for U.S. Appl. No. 17/006,059 (pp. 1-9).

* cited by examiner

400

400

400

400

FIG. 16
$800.43
$10,000.18
$50.00
GRAND
JACKPOTS
CREDIT 16897
WIN 0
BET UP FOR MORE
JACKPOT SELECTIONS
88
176
264
352
440
PLAY

600

700

GAMING MACHINES AND METHOD FOR INCREASED RETURN TO PLAYER MODE

CROSS REFERENCE TO RELATED APPLICATIONS

This application is a continuation of and claims priority to U.S. patent application Ser. No. 17/006,059, filed Aug. 28, 2020, which claims priority to U.S. Provisional Patent Application No. 62/893,590, filed Aug. 29, 2019 which are hereby incorporated by reference herein in their entireties.

TECHNICAL FIELD

The field of disclosure relates generally to electronic gaming, and more particularly to an electronic gaming machine and method of operation thereof that includes one or more increased return to player (RTP) modes with expanded rows or guaranteed wilds.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash out button to receive a ticket from the ticket printer). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines create situations of enhanced RTP during bonus play, where the bonus play game provides increased possibilities of and/or chances of winning to the player. However, these known gaming machines do not allow for notifying the player how close they are to reaching an enhanced RTP situation. Gaming systems and methods are needed that provide enhanced RTP modes in more situations to increase player enjoyment and engagement.

BRIEF DESCRIPTION

In one aspect, an electronic gaming machine for providing an increased return to player (RTP) mode is provided. The electronic gaming machine includes at least one display device, at least one processor; and at least one memory device in communication with the at least one processor, the at least one memory device storing instructions which when executed by the at least one processor causes the at least one processor to, at least display a user interface in a first game mode on the at least on display device, the user interface including a first quantity of mode tracking element positions; determine a first outcome for the first game mode, based at least in part on a first output from a random number generator; add a first mode tracking element to the mode tracking element positions, in response to determining that the first outcome includes a mode tracking element; determine a second outcome for the first game mode, based at least in part on a second output from the random number generator; add a second mode tracking element to the mode tracking element positions, in response to determining that the second outcome includes a mode tracking element; update the user interface to display a second game mode, in response to determining that the first quantity of mode tracking element positions have been filled with mode tracking elements; and determine a third outcome for the second game mode, based at least in part on a third output from the random number generator.

In another aspect, a computer-implemented method is provided which includes causing to be displayed, by a controller, a user interface in a first game mode on a display device, the user interface in the first game mode including a first plurality of symbol display positions; determining whether a first mode tracking element is in each outcome of a plurality of outcomes of the first game mode, each outcome of the plurality of outcomes of the first game mode comprising a plurality of symbols displayed at the first plurality of symbol display positions; accumulating, on the user interface, each first mode tracking element in the plurality of outcomes of the first game mode; causing the user interface to update to display the user interface in a second game mode in response to determining that a first quantity of mode tracking elements have been accumulated, the user interface in the second game mode including a second plurality of symbol display positions; and determining an outcome for each of a quantity of second game mode outcomes, each outcome of the quantity of second game mode outcomes comprising a plurality of symbols displayed at the second plurality of symbol display positions, where the quantity of second game mode outcomes is based on the first quantity of mode tracking elements.

In yet another aspect one or more non-transitory computer-readable storage media comprising instructions are provided. The instructions when executed by at least one processor cause the one or more processors to, at least: display a user interface in a first game mode on the at least on display device, the user interface including a first quantity of mode tracking element positions and a plurality of symbol display positions, the plurality of symbols display positions arranged in a plurality of columns, each column of the plurality of columns having a column height; determine a first outcome for the first game mode, based at least in part on a first output from a random number generator; add a first mode tracking element to the mode tracking element positions, in response to determining that the first outcome includes a mode tracking element; determine a second outcome for the first game mode, based at least in part on a second output from the random number generator; add a second mode tracking element to the mode tracking element positions, in response to determining that the second outcome includes a mode tracking element; update the user interface to display a second game mode, in response to determining that the first quantity of mode tracking element positions have been filled with mode tracking elements, wherein the column height of at least one of the plurality of columns in the second game mode in increased; and determine a third outcome for the second game mode, based at least in part on a third output from the random number generator.

BRIEF DESCRIPTION OF THE DRAWINGS

An example embodiment of the subject matter disclosed will now be described with reference to the accompanying drawings.

DETAILED DESCRIPTION

In the exemplary embodiment, an electronic gaming machine (EGM) provides an increased return to player (RTP) mode to the player during base play. In the exemplary embodiment, this enhanced RTP mode occurs during the player's base wagering game and provides a number of plays in the enhanced RTP mode. In some embodiments, the enhanced RTP mode requires a wager to be made by the player. In some embodiments, the enhanced RTP mode may carry over to a bonus game that the player triggers. In the exemplary embodiment, the enhanced RTP mode increases the player's play area from 3×4×4×4×3 to either 3×6×6×6×3 or 3×8×8×8×3. In other embodiments, the enhanced RTP mode provides guaranteed and automatic wilds with each enhanced RTP mode spin. In some embodiments, the EGM displays the player's progress to accessing the enhanced RTP mode. In some further embodiments, the EGM displays the player's progress to the enhanced RTP mode for each bet level, where each different bet level has a corresponding enhanced RTP mode. In still further embodiments, the progress to the enhanced RTP modes is persistent across players on the EGM, where the EGM displays its current progress to each of the enhanced RTP modes including during demo mode or while no game is being actively played on the EGM.

Figure 1:
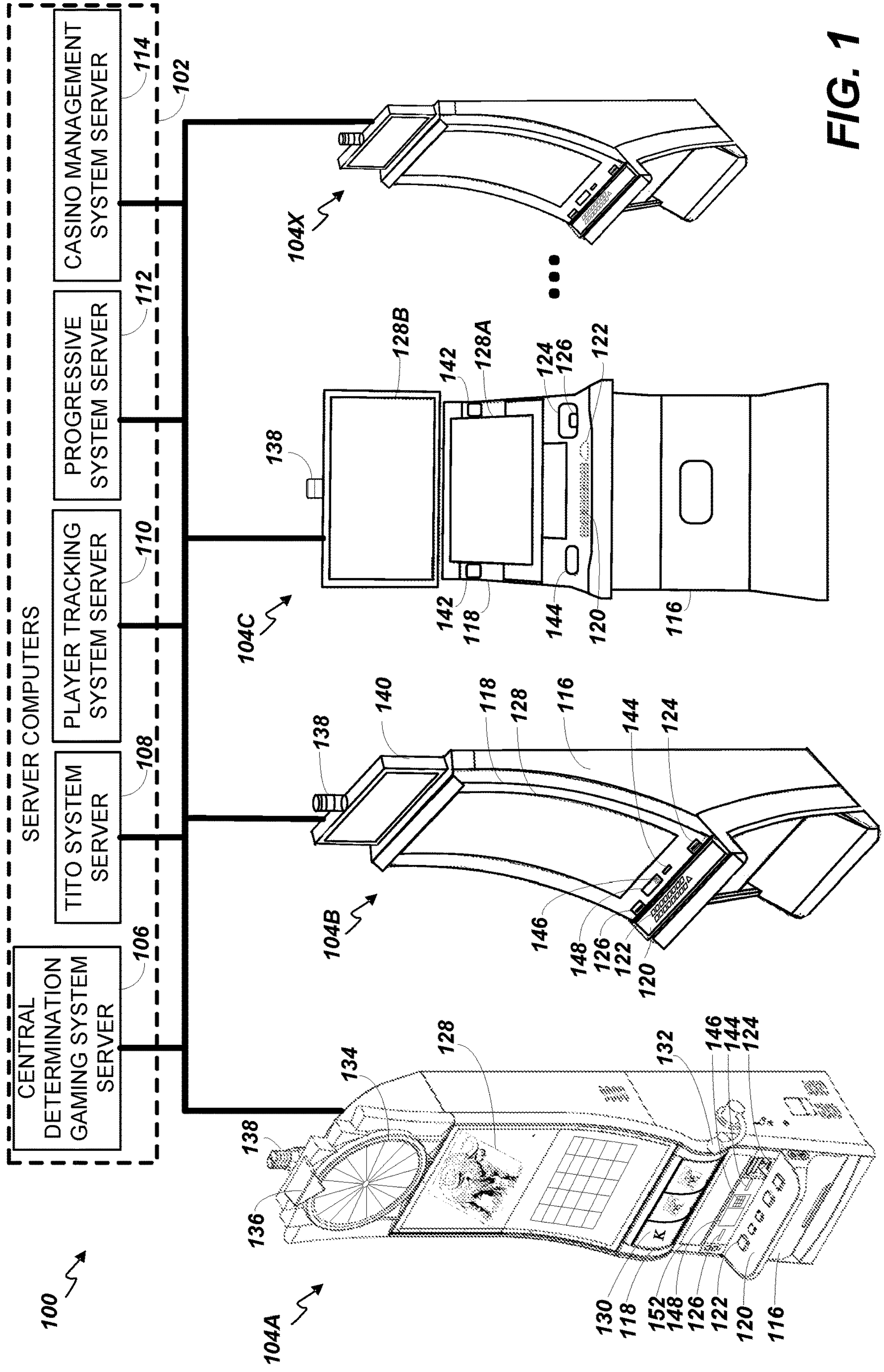
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
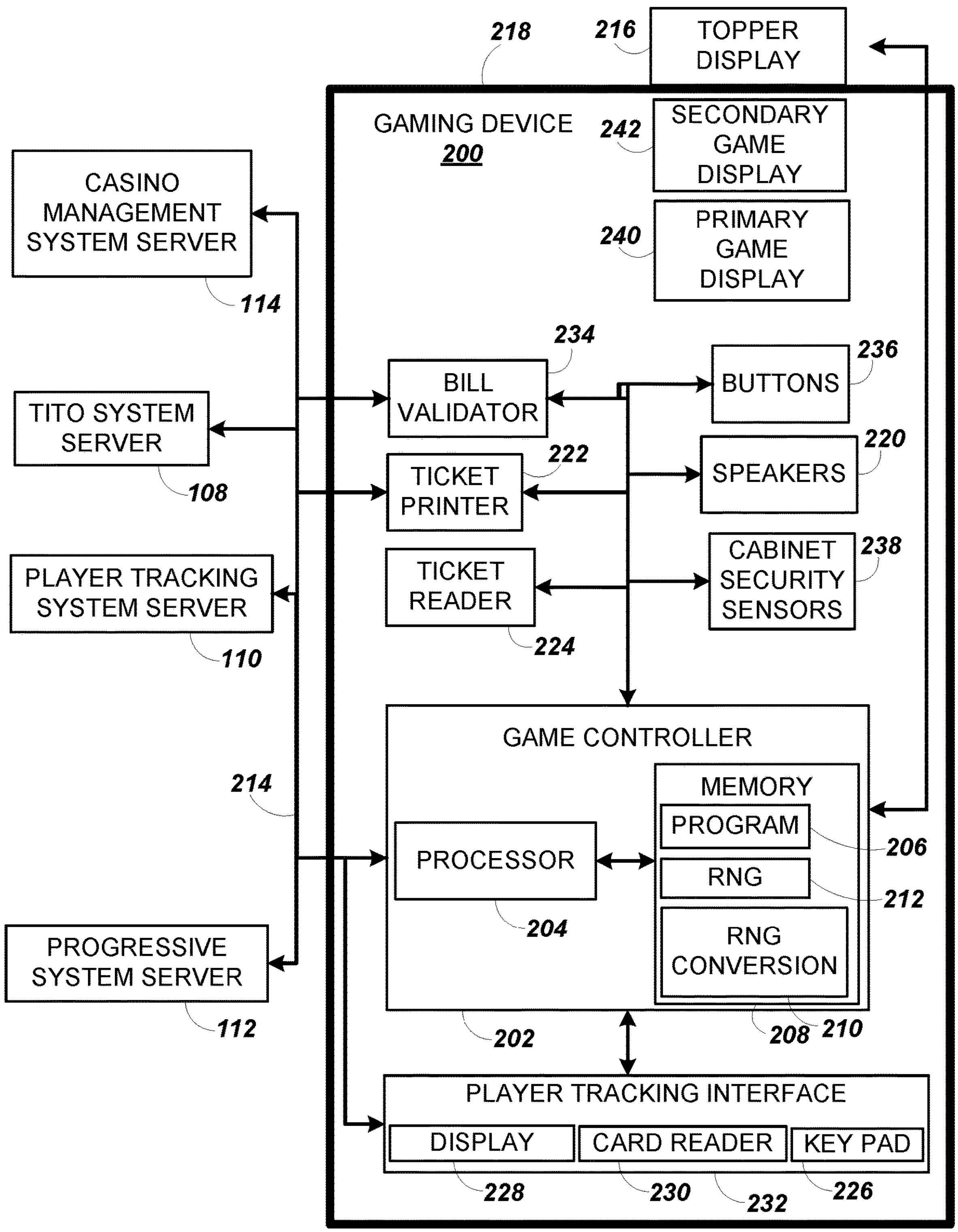
FIG. 2A is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2A.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
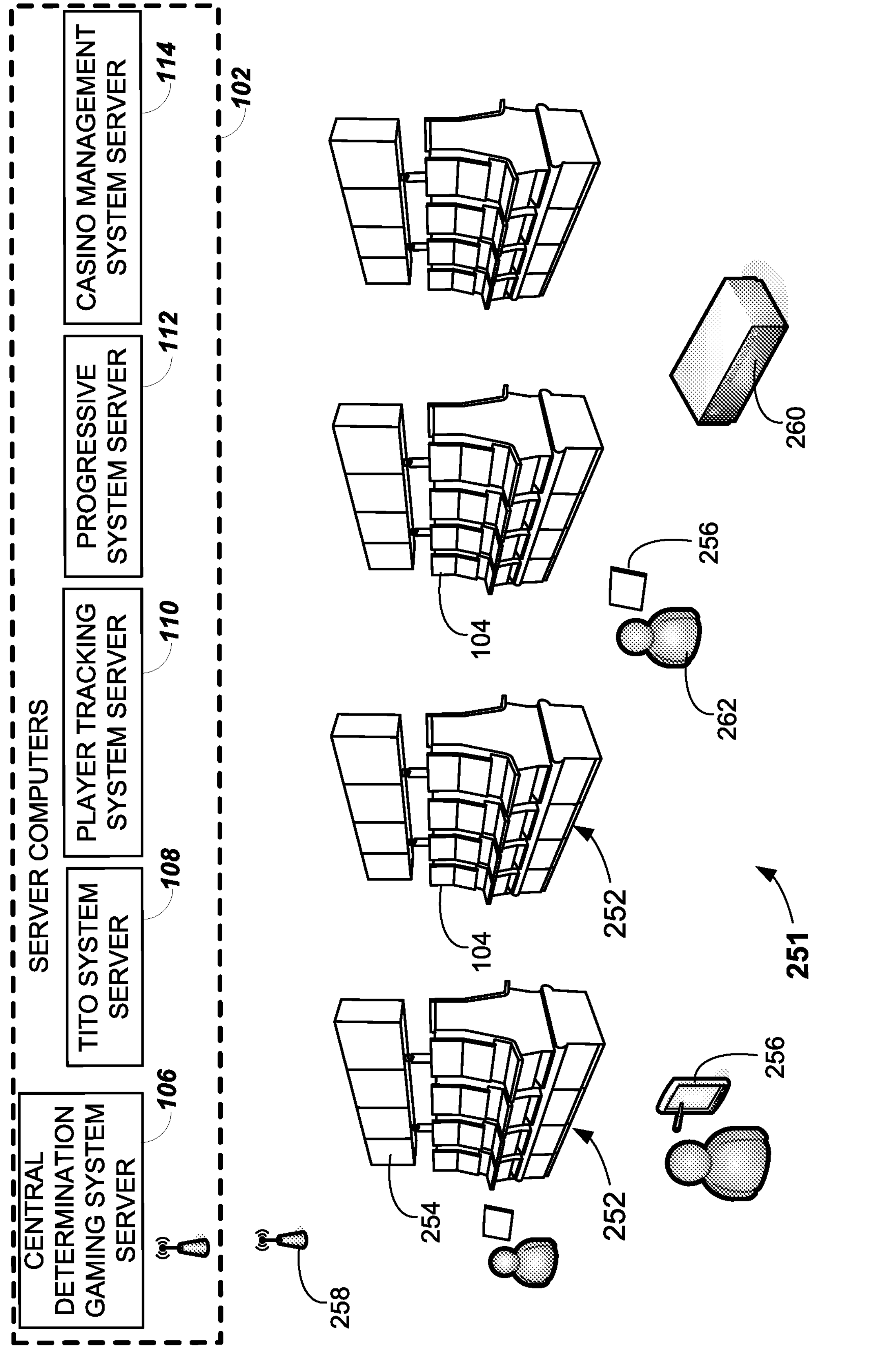
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
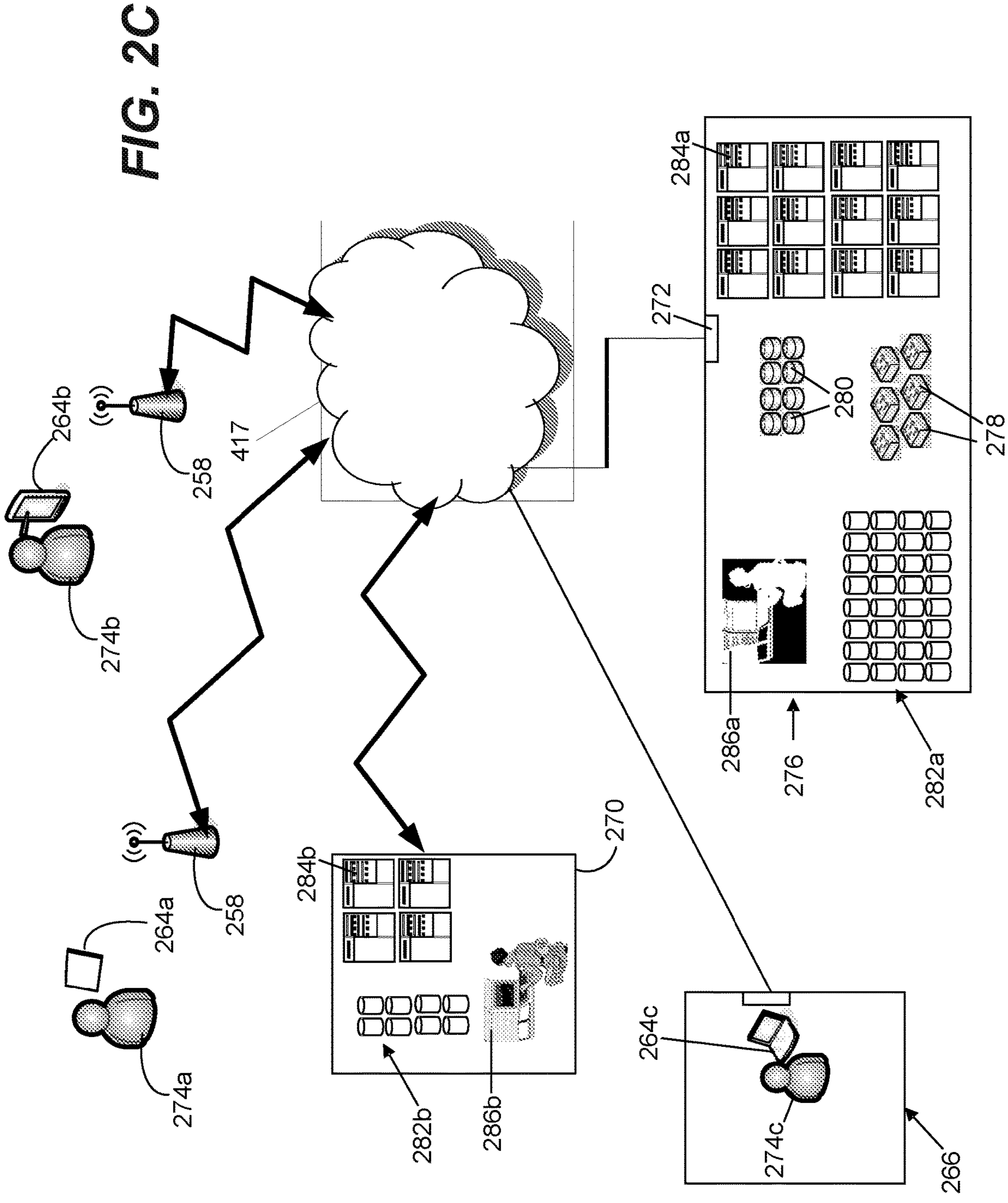
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*. 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
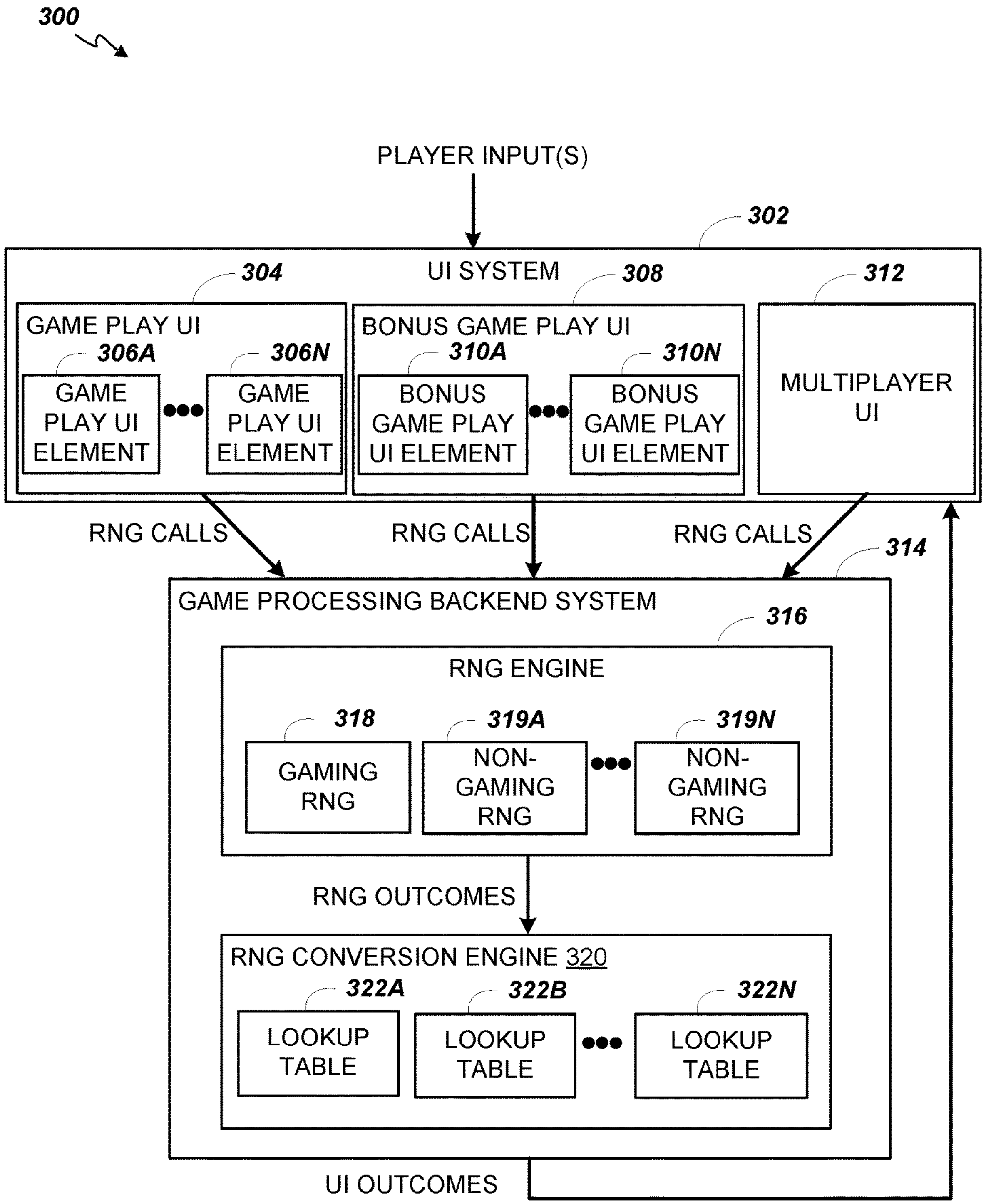
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
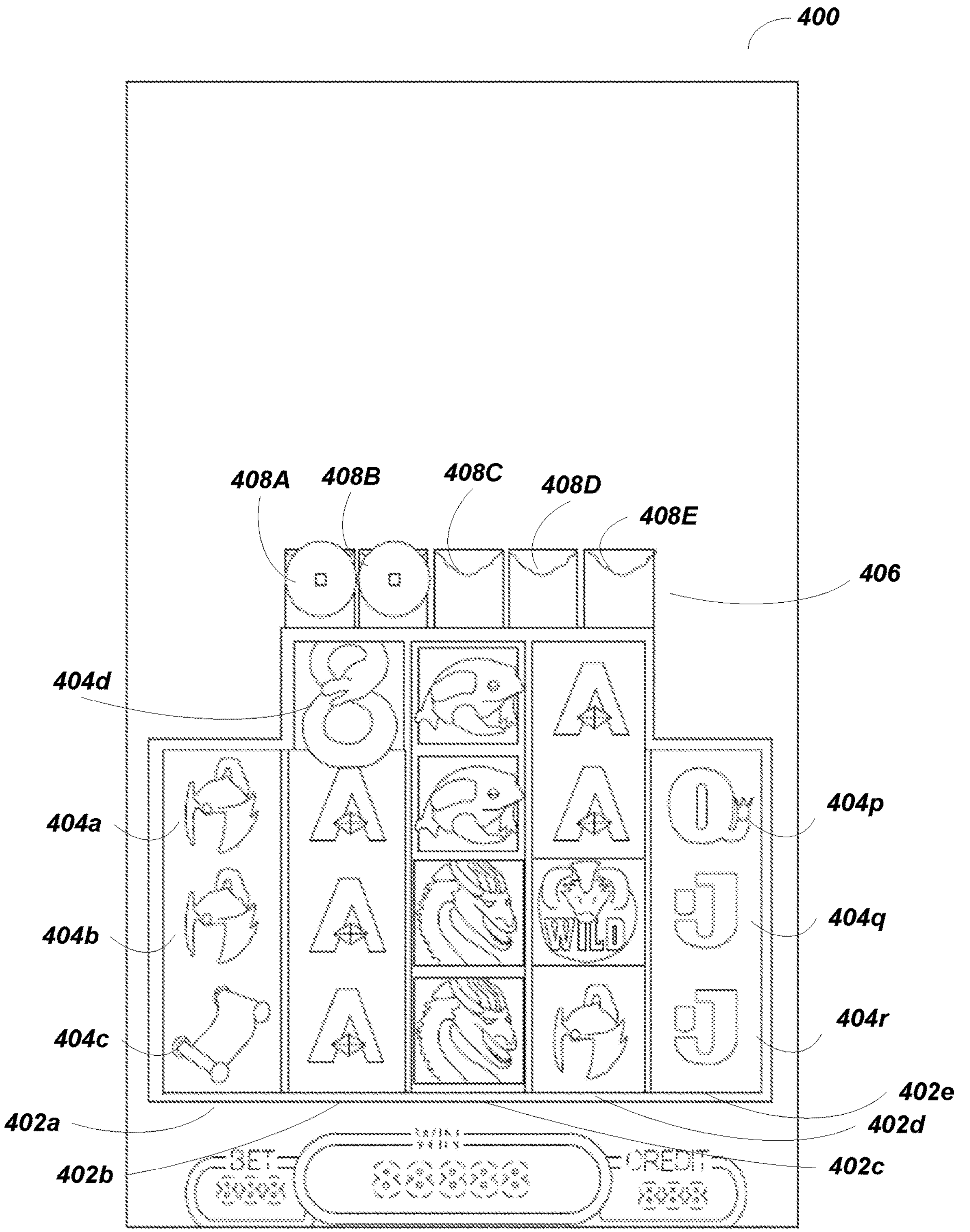
FIG. 4 illustrates a view of an exemplary user interface for an EGM with an enhanced RTP mode in accordance with one embodiment of the disclosure.

FIG. 4 illustrates a view of an exemplary user interface 400 for an EGM with an enhanced RTP mode in accordance with one embodiment of the disclosure. In the exemplary embodiment, the user interface 400 may be associated with one of gaming devices 104A-104X (shown in FIG. 1) and gaming device 200 (shown in FIG. 2). In the exemplary embodiment, user interface 400 is similar to game play UI 304 (shown in FIG. 3). In some embodiments, user interface 400 may be similar to bonus game play UI 308 (shown in FIG. 3). In the exemplary embodiment, user interface 400 is a part of UI system 302 (shown in FIG. 3).

In the exemplary embodiment, user interface 400 includes a plurality of columns 402*a-e*, each of which displays a plurality of symbol display positions 404. Symbol display positions 404*a-r* may be similar to game play UI elements 306A-306N (shown in FIG. 3). In some embodiments, each column 402 may visually be depicted as a reel of a slot game. Further, each symbol display position may represent a symbol display position that corresponds to a symbol displayed on the reel of the slot game.

The user interface 400 also includes an enhanced RTP mode tracker 406 (also known as a frenzy mode tracker 406). The enhanced RTP mode tracker 406 includes a plurality of tracking elements 408A-408E. In the embodiment shown in FIG. 4, the tracking elements 408 are envelopes and coins, where tracking elements 408A and 408B have been activated (with a coin in the envelope) and tracking elements 408C-E have not been activated yet (no coins in the envelope), where each coin represents a step towards activating the enhanced RTP mode. At the point shown in FIG. 4, the player is two of the five steps towards activating the enhanced RTP mode. In the exemplary embodiment, when a specific symbol display position 404 or specific plurality of symbol display positions 404 appear in the user interface 400, another tracking element 408 is activated in the enhanced RTP mode tracker 406. For example, if a coin appears in the symbol display positions 404, then a tracking element 408 (such as tracking element 408C) is activated. In the coin embodiment shown herein, when a tracking element 408 is activated, a new coin is displayed in a previously unactivated position (such as 408C) on the enhanced RTP mode tracker 406. In some embodiments, when the activation symbol(s) appears in symbol display positions 404, more than one tracking element 408 is activated. In these embodiments, the number of tracking elements 408 activated may be based on the activation symbol(s) or the number of tracking elements 408 activated may be based on one or more random numbers generated by the game processing backend system 314 (shown in FIG. 3).

In the embodiment shown herein, there are five tracking elements 408A-408E. When all five tracking elements 408A-408E have been activated, then the enhanced RTP mode is activated. In other embodiments, there may be more or less tracking elements 408. In other embodiments, the tracking elements 408 may be different objects than envelopes and coins. Furthermore, in some other embodiments, the tracking elements 408 may be different. For example, in one embodiment, the different tracking elements 408 may be different suites, such as from a deck of cards.

In various embodiments, the enhanced RTP mode is a mode in which the player wagers the same amount at the same denomination as prior to the enhanced RTP mode.

Figure 5:
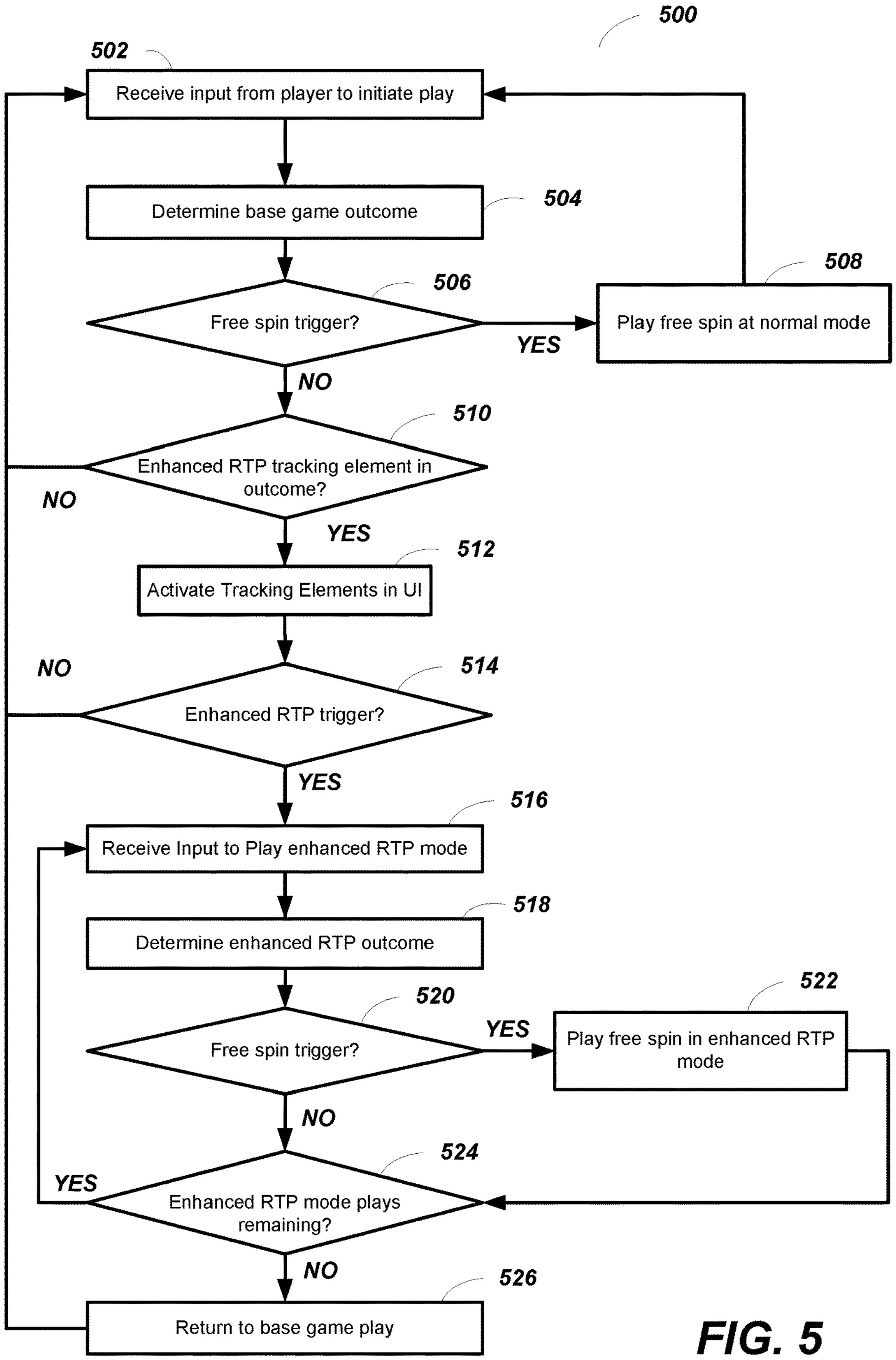
FIG. 5 illustrates a process for executing a game with an enhanced RTP mode on an EGM in accordance with one embodiment of the disclosure.
Figure 6:
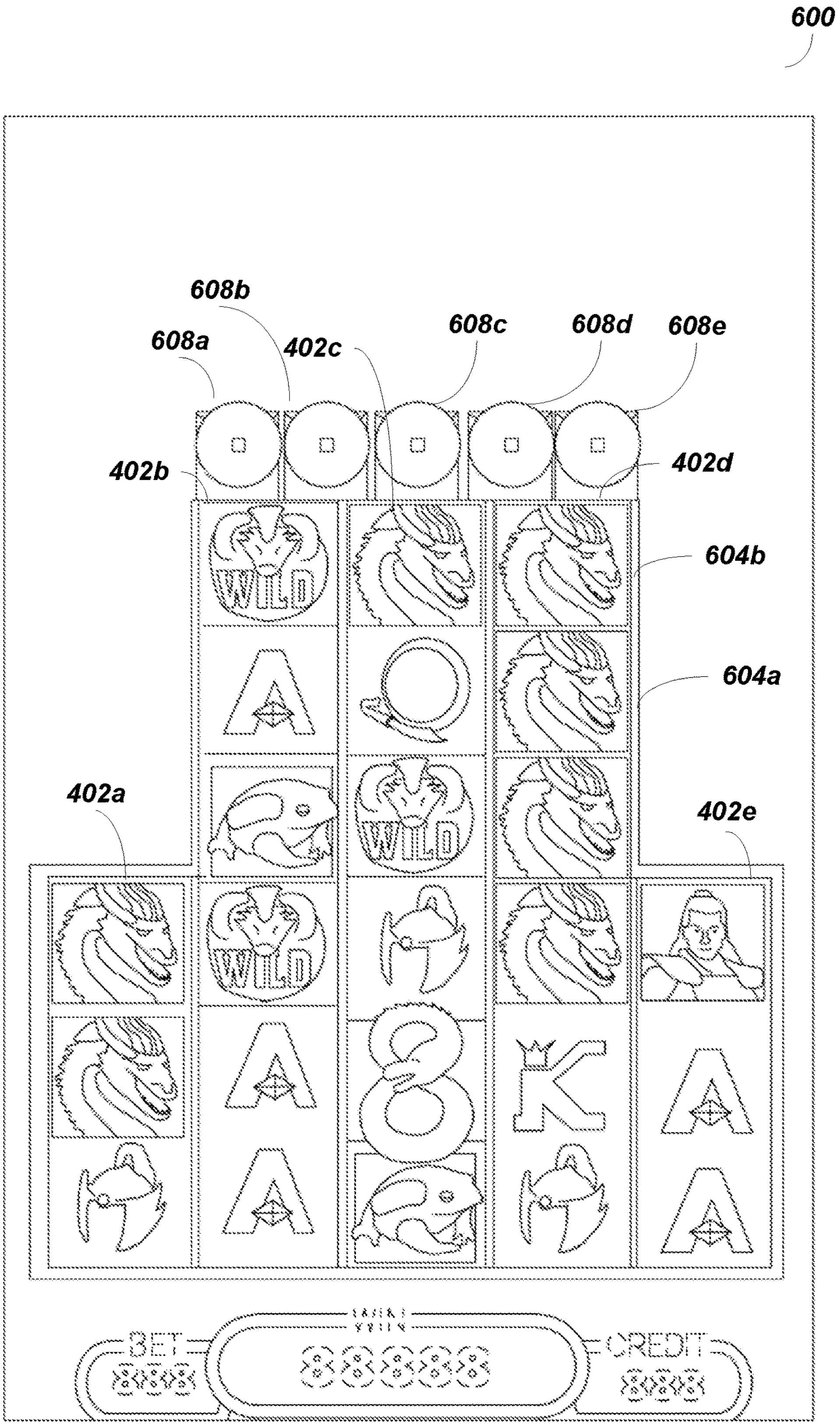
FIG. 6 illustrates another view of the user interface during an enhanced RTP mode in accordance with one embodiment.
Figure 7:
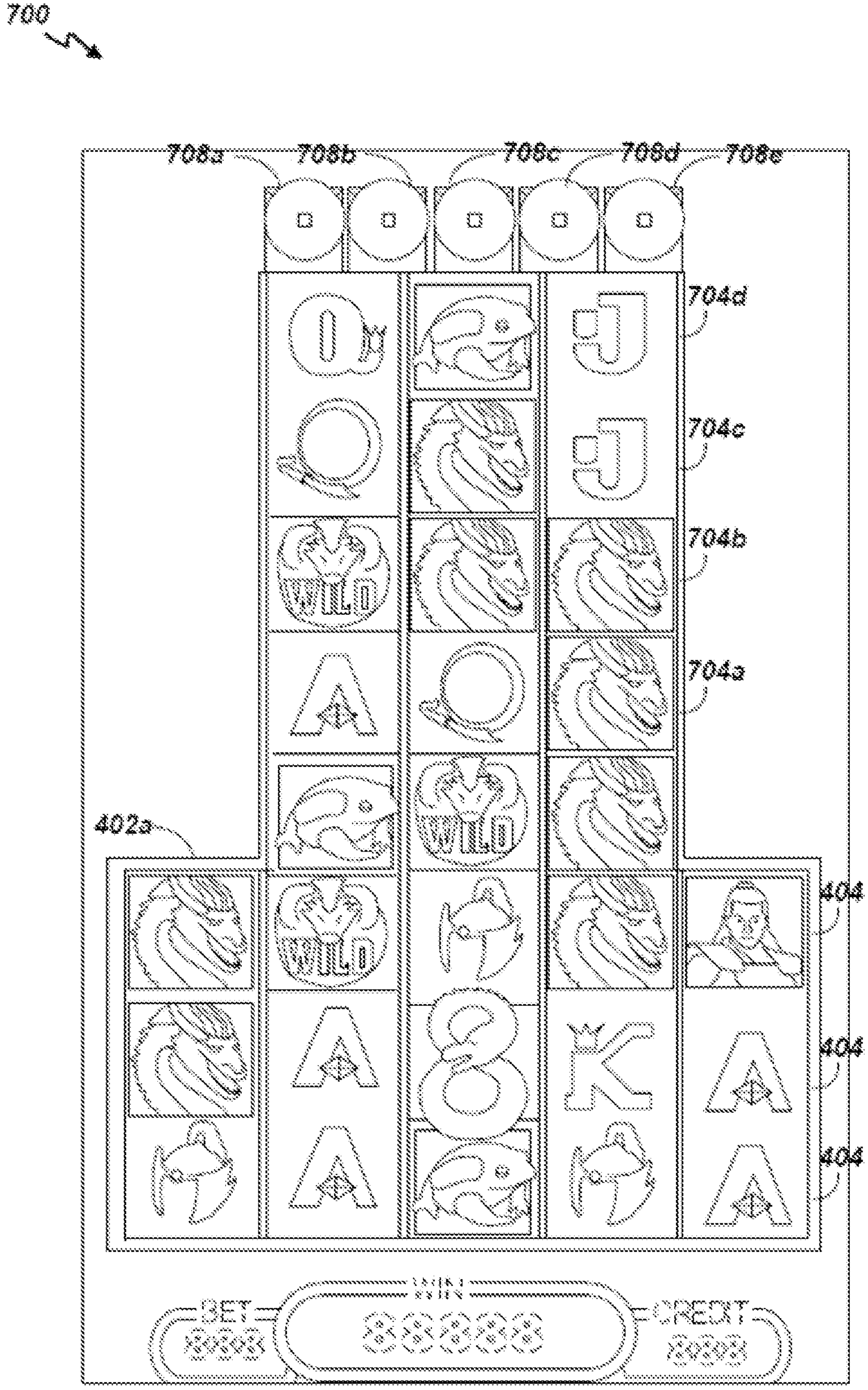
FIG. 7 illustrates a further view of the user interface during another enhanced RTP mode in accordance with another embodiment.
Figure 8:
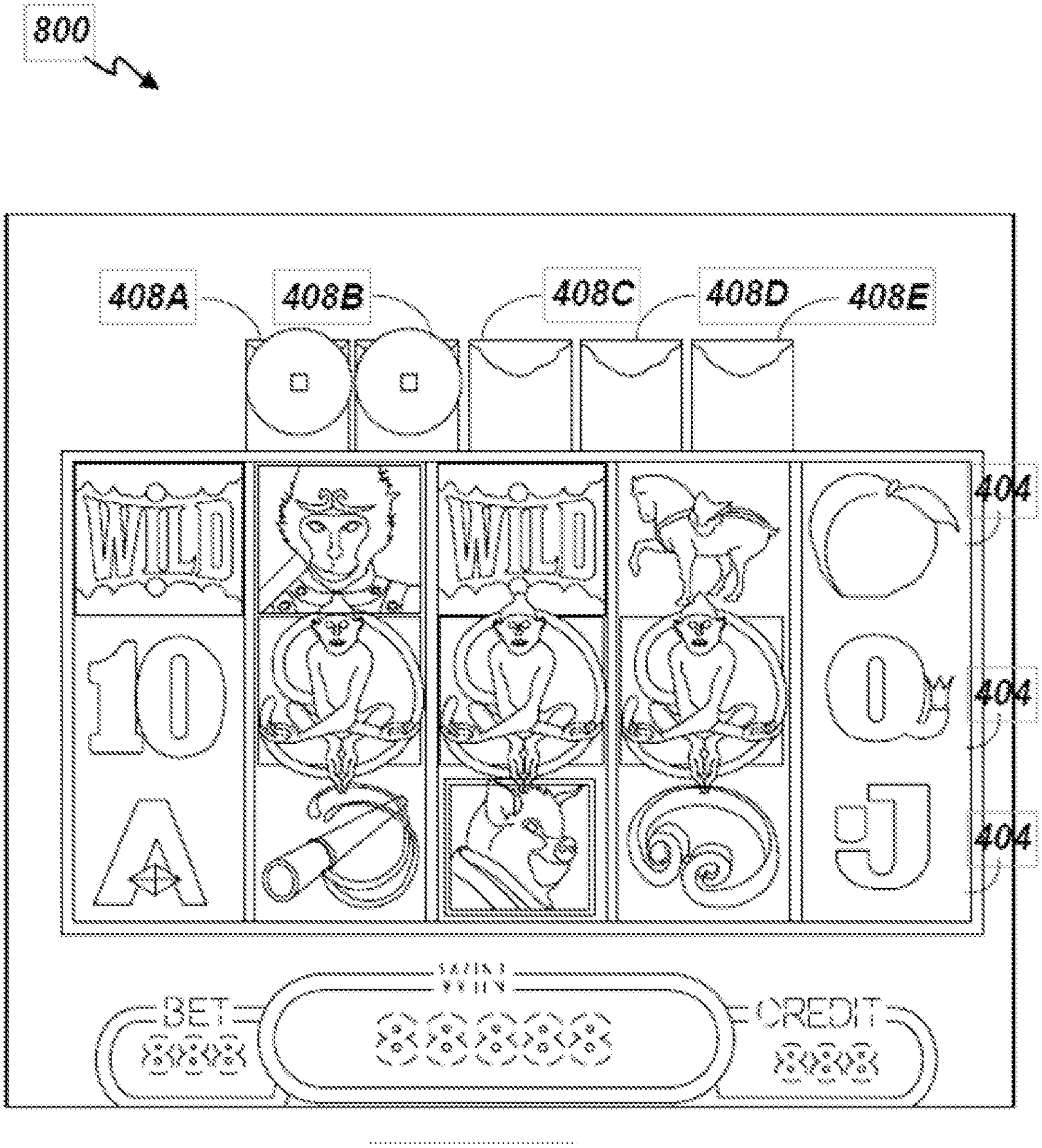
FIG. 8 illustrates a view of another exemplary user interface for an EGM with an enhanced RTP mode in accordance with another embodiment of the disclosure.

In at least one embodiment, the EGM supports several enhanced RTP modes. FIG. 5 illustrates a first enhanced RTP mode. FIG. 6 illustrates a second, similar enhanced RTP mode. FIGS. 7 and 8 illustrate a different type of enhanced RTP mode based on guaranteed wilds rather than an increased number of rows.

FIG. 5 illustrates a process 500 for executing a game with an enhanced RTP mode on an EGM in accordance with one embodiment of the disclosure. In the exemplary embodiment, process 500 may be associated with one of gaming devices 104A-104X (shown in FIG. 1) and gaming device 200 (shown in FIG. 2). In these embodiments, process 500 may be executed by the game controller 202 (shown in FIG. 2).

In the exemplary embodiment, at block 502, the game controller 202 receives input from the player to initiate play. In some embodiment, the game controller 202 receives this input through a user interface device such as one or more buttons 236, the primary game display 240, and the secondary game display 242 (all shown in FIG. 2). In various embodiments, prior to being able to initiate play, a player may have to establish a credit balance on gaming device 200. The player may make a transaction to deposit credits on the gaming device 200, be inserting a currency bill or coin via an input mechanism such as bill validator 234, inserting a ticket that represents credits via ticket reader 224, or electronically depositing credits through electronically initiating a transaction in conjunction with one or more of the casino management server 114, TITO server 108 or player tracking server 110.

The game controller 202 determines the base game outcome symbol display positions at block 504. In various embodiments, game controller 202 determines the base game outcome by generating one or more random numbers via RNG engine 316. Game controller 202 uses the generated random numbers to select reel stop positions or any other way to select symbols for symbol display positions 404. In other embodiments, game controller 202 may receive an outcome from a central server, such as a bingo server or a central determination server and use the outcome to generate symbols for symbol display positions 404.

In various embodiments, game controller 202 determines if symbol display positions 404 form symbol combinations that are stored in a paytable in memory 208. Various symbol combinations may have corresponding award amounts associated with them in the paytable. Game controller 202 may determine an award amount based on a sum of the one or more award amounts for the symbol combinations formed by symbol display positions 404.

The game controller 202 determines if a free spin trigger is present in the symbol display positions 404, at block 506. In various embodiments, the free spin trigger may be a symbol or symbol combination formed by symbol display positions 404. In some embodiments, the free spin trigger may be a random determination by RNG engine 316 to trigger the free spin game. If the free spin trigger is present, then the game controller 202 may initiate play of the awarded free spins at normal mode, at 508. In some embodiments, the game controller 202 returns to block 502 after the free spin play. In other embodiments, the game controller 202 continues to block 510.

The game controller 202 determines, at block 510, if an enhanced RTP mode element is present in the plurality of symbol display positions 404. If not, the game controller 202 returns to the base game play at block 502. If the plurality of symbol display positions 404 include an enhanced RTP mode element, then the game controller 202 activates one or more tracking elements 408, at block 512. The game controller 202 may determine if the enhanced RTP trigger has been met, such as the activation of all of the tracking elements 408A-E, at block 514. If not, the game controller 202 returns to the base game play at block 502. If all of the tracking elements 408A-E have been activated, then the game controller 202 activates the enhanced RTP mode. In some embodiments, the player receives a number of enhanced RTP mode plays based on the number of activated tracking elements 408. In various embodiments, enhanced RTP model elements collected during game play persist from one play to the next. In some of these embodiments, the elements persist indefinitely until the enhanced RTP mode is triggered. In some of these embodiments, the elements persist for a predetermined event, such as until a cash out event, until a predetermined number of wagers have been made, or randomly determined event. In certain embodiments, each element has a predetermined expiration threshold, whereby, after the threshold, the accumulated element expires. In various embodiments, elements that expire are removed from the tracking element display.

In various embodiments, enhanced RTP mode may be presented visually to the player. In other embodiments, enhanced RTP mode is not visually distinguished from regular game play as represented in the exemplary embodiment of FIG. 4. In some of these embodiments, enhanced RTP mode may use a pay table that provides a higher RTP. In some of these embodiments, enhanced RTP mode may employ one or more of (i) increased award amounts for existing symbol combinations; (ii) increased symbols combinations that provide a payout (e.g. paying out on a 2 of a kind instead of requiring at least a 3 of a kind to win an award); (iii) increasing the frequency of certain symbols landing; (iv) increasing the amount of wild symbols on the reel strips; (v) adding sticky wilds to symbol display positions 404; (vi) providing a different reel strip set with more symbols, or higher paying symbols; (vii) increasing the number of paylines; or (viii) increasing the number of symbol display positions by increasing reel height for one or more reels; (ix) adding a right to left pay evaluation to a left to right pay evaluation. FIG. 6 depicts one exemplary view of the user interface to implement an enhanced RTP mode with increased reel height for reels 2, 3, and 4, in accordance with various embodiments.

Further, in various embodiments, more than one play of the enhanced RTP mode may be provided. The quantity of play may be predetermined, randomly determined, based on the quantity of enhanced RTP mode elements, wager level, or combinations thereof.

In the enhanced RTP mode, the game controller 202 may receive an input from the player to initiate play of the enhanced RTP mode, at 516. In various embodiments, a wager is required to play the enhanced RTP mode. The wager amount may be the same as the wager amount before the enhanced RTP mode was activated. In certain embodiments, the player may choose to not wager at the enhanced RTP mode and may choose to return to the base wager. The control may then return to block 502. If the player choose to make a wager in the enhanced RTP mode, game controller 202 may determine an outcome for a play of the enhanced RTP mode at 518.

The game controller 202 determines the enhanced RTP mode outcome and then evaluates the plurality of symbol display positions 404. Game controller generates an outcome by selecting symbols for symbol display positions based on random numbers from RNG engine 316. The selected symbols may be compared to an enhanced RTP pay table to determine if any symbol combinations formed are eligible for awards. As discussed above, an enhanced RTP paytable may be used to determine symbol combinations and award amounts.

The game controller 202 determines if a free spin trigger condition exists in the outcome of the enhanced RTP mode play. In various embodiments, one or more free spin triggers may be present in the plurality of symbol display positions 404 to trigger the free spin mode. In the example of FIG. 6, where the enhanced RTP mode is played with reels 2-4 having more symbol display positions than in the regular game play mode, the extra symbol positions due to the extended reel height are included in the symbol display positions 404. In various embodiments If there are free spin triggers present, the game controller 202 initiates play of those free spins in the enhanced RTP mode at 522. Free spins played in the enhanced RTP mode differ from any free spin played in the normal mode, as the outcome of the free spins in the enhanced RTP mode is based on the enhanced RTP as compared to the normal RTP. Further, in certain embodiments, the quantity of free spins provided in the enhanced RTP mode may be greater than the quantity of spins provided in the normal mode, to further enhance the RTP. In some embodiments, the quantity may be the same. Further, in some embodiments, the quantity of free spins for play of the free spin bonus game for each of the normal mode and the enhanced RTP mode may be predetermined, randomly determined, based on one or more trigger conditions, such as quantity of triggering symbols, etc.

After completion of play of the enhanced RTP free spins or after determination that a free spin trigger condition does not exist, game controller 202 determines if there are any enhanced RTP mode plays remaining at 524. If there are, then the process 500 returns to block 516. If not, then the game controller returns to base game play at block 502.

FIG. 6 illustrates a view of the user interface 600 during an enhanced RTP mode in accordance with one embodiment. In the exemplary embodiment, the user interface 600 may be associated with one of gaming devices 104A-104X (shown in FIG. 1) and gaming device 200 (shown in FIG. 2). In the exemplary embodiment, user interface 600 is similar to game play UI 304 (shown in FIG. 3). In some embodiments, user interface 600 may be similar to bonus game play UI 308 (shown in FIG. 3). In the exemplary embodiment, user interface 600 is a part of UI system 302 (shown in FIG. 3).

In the exemplary embodiment, user interface 600 displays the enhanced RTP mode with the three middle columns 602*b-d* having been increased in size by two additional rows 604*a-b*. The two additional rows 604*a-b* increase the RTP of the game since there are more paylines (if the game is a payline evaluation), symbol combination for ReelPower wins, or scatter wins, which increases the probability a winning combination of symbols. In some embodiments, the game controller 202 evaluates the plurality of symbol display positions 404 based on the number of symbols appearing in the play area of the user interface 600 to determine awards. In other embodiments, game controller 202 evaluates the plurality of symbol display positions 404 based on one or more pay lines.

In the exemplary embodiment, the number of plays in the enhanced RTP mode is equal to the number of tracking elements 608*a*-608*e*. For example, as shown in FIG. 6, there are five tracking elements 608*a*-608*e*. When all five tracking elements 608*a*-608*e* are activated, then the enhanced RTP mode is activated and the user interface increases three of the columns 602 by two rows 604. In the exemplary embodiment, as each play is used, a tracking element 608 is deactivated, to visually depict to the player the number of plays of the enhanced RTP mode remaining. In the embodiment shown in FIG. 6, the player has all five plays available.

In the exemplary embodiment, plays of the enhanced RTP mode require a wager for each play of the enhanced RTP mode. For example, 5 plays (e.g., spins or hands) of the enhanced RTP mode may be triggered after five out of five enhanced RTP elements have been collected. For each of those 5 plays, a wager input is required for that play. In the exemplary embodiment, the amount of the wager is the same for each of the 5 plays. For example, the player bets 3 credits for each of the 5 plays. Further, the wager may be the same as the amount wagered immediately prior to the play of the enhanced RTP mode. If during any of the 5 plays, a trigger condition activates a bonus game, such as a free spin game, then those free spins are performed in the enhanced RTP mode. For example, the player is awarded 5 plays in the enhanced RTP mode during base game play. The player bets 3 credits for the first play of the enhanced RTP mode. During the first play, the player activates a bonus game which awards 8 free plays in the bonus game. The bonus game activates during the enhanced RTP mode and the 8 free plays are played using the extra two rows 604 of the enhanced RTP mode. Once the bonus game is finished, the player returns to the base game enhanced RTP mode and completes the 4 remaining plays in the enhanced RTP mode. In the exemplary embodiment, the bonus game is activated in the same manner during regular base game play and the enhanced RTP mode base game play. In other embodiment, the enhanced RTP mode may provide additional methods for activating the bonus game.

In the exemplary embodiment, the game controller 202 tracks the progress to the enhanced RTP mode based on wager level. In other words, each wager level has a corresponding progress for the enhanced RTP mode. For example, if the base game is configured for five different levels of wager amount (e.g., from one credit to five credits), game controller 2020 also tracks the progress towards the enhanced RTP mode for each of the five different wager levels. If the player switches from one wager level to a different level, tracking for the enhanced RTP mode also switches to the new mode. For example, if the player is playing at the one credit level of play, then any elements in the game outcome are tracked the progress towards the one credit level's enhanced RTP mode. When the enhanced RTP mode is activated, the player may only bet one credit for each play awarded in that mode. The player may not activate the enhanced RTP mode playing at one credit a play and then increase their bet to five credits when the enhanced RTP mode is activated.

Furthermore, in some embodiments, the progress towards the enhanced RTP mode is persistent for the EGM. For the purposes of this disclosure, persistent means continuing to exist or endure over a prolonged period. In these embodiments, the EGM does not reset the progress to the enhanced RTP mode for any of the wager levels when the player changes or if the game is not being actively played. For example, a first player may play on the EGM and earns two elements for the enhanced RTP mode. The first player may leave the game at some point. At a later point a different player may then start playing the game on the EGM. The EGM already has the two elements for the enhanced RTP mode. The second player may then collect three more elements for the enhanced RTP mode and activate the enhanced RTP mode.

In some embodiments, the player is not required to play all of the enhanced RTP mode plays. For example if the player does not have sufficient credit to play all of those plays or wishes to allow a friend or spouse to play the enhanced RTP mode plays, the player may cease play at the EGM. The next player at the EGM may then play the remaining enhanced RTP mode plays.

In various embodiments, the progress towards the enhanced RTP mode and the quantity of plays in the enhanced RTP mode are personal to the player. That this is progress may be stored in a player tracking account, or such, and be retrieved at a different gaming machine, or same gaming machine at a later time, where the player uses their player tracking account. When a player ends a play session, this information may then be stored on their account for later retrieval.

FIG. 7 illustrates a further view of the user interface 700 during another enhanced RTP mode in accordance with another embodiment. In the exemplary embodiment, the user interface 700 may be associated with one of gaming devices 104A-104X (shown in FIG. 1) and gaming device 200 (shown in FIG. 2). In the exemplary embodiment, user interface 600 is similar to game play UI 304 (shown in FIG. 3). In some embodiments, user interface 600 may be similar to bonus game play UI 308 (shown in FIG. 3). In the exemplary embodiment, user interface 600 is a part of UI system 302 (shown in FIG. 3).

In the exemplary embodiment, user interface 700 displays the enhanced RTP mode with the three middle columns 402*b-d* increasing in size by four additional rows 704*a-d*. The four additional rows 704*a-d* increase the probability of the player receiving a winning combination of symbols, due to the increased number of symbol combinations that are possible with the increased rows. In some embodiments, the game controller 202 evaluates the plurality of symbol display positions 404 based on the number of symbols appearing in the play area of the user interface 700 to determine player awards. In other embodiments, game controller 202 evaluates the plurality of symbol display positions 404 based on one or more pay lines.

In some embodiments, the player enters one of the two enhanced RTP modes shown in FIGS. 6 and 7 randomly upon completing progress to the enhanced RTP mode. For example, after the trigger condition for the enhanced RTP mode has been met (such as collection of the tracking elements 408), a random determination may be made as to which enhanced RTP mode is to be displayed and provided. In certain embodiments, the random determination is completely random (equally weighted), whereas in other embodiments, the random determination may be weighted. For example, a weight of 75% may be assigned to the enhanced RTP mode as shown in FIG. 6 and a weight of 25% may be assigned to the enhanced RTP mode as shown in FIG. 7. In some embodiments, there may be more than two enhanced RTP modes. In some of these embodiments, one or more of the enhanced RTP modes may be different than one or more of the other enhanced RTP modes, such that they may use a different mechanism (than using increased rows for one or more columns) to enhance the RTP.

In some embodiments, the progress to the two or more different enhanced RTP modes may be tracked separately. In some embodiments, each mode may have its own collection elements. For example, a there may be a red collection element that is tracking towards the enhanced RTP mode as shown in FIG. 6 and a gold collection element that is tracking towards the enhanced RTP mode as shown in FIG. 7. In some embodiments, there may be some elements that are common for the two or mode modes and some elements that are specific for one or more modes. In some embodiments, while one enhanced RTP mode is being played, collection elements for one or more of the other modes may still be collected and if triggered, the second enhanced RTP mode may add to the first enhanced RTP mode.

In some embodiments, the enhanced RTP mode that is provided to the player for play may depend on a wager amount of the player. For example, the enhanced RTP mode of FIG. 6 may be available for all wager levels, whereas the enhanced RTP mode of FIG. 7 may only be available at a higher wager level.

FIG. 8 illustrates a view of another exemplary user interface 800 for an EGM with an enhanced RTP mode in accordance with another embodiment of the disclosure. In the exemplary embodiment, the user interface 800 may be associated with one of gaming devices 104A-104X (shown in FIG. 1) and gaming device 200 (shown in FIG. 2). In the exemplary embodiment, user interface 800 is similar to game play UI 304 (shown in FIG. 3). In some embodiments, user interface 800 may be similar to bonus game play UI 308 (shown in FIG. 3). In the exemplary embodiment, user interface 800 is a part of UI system 302 (shown in FIG. 3).

In this embodiment, the enhanced RTP mode provides the player with one or more guaranteed wilds for each spin during the enhanced RTP mode. Similar to the enhanced RTP mode described above, the player has to perform a series of steps to reach the enhanced RTP mode, such as collect a series of coins (e.g., tracking elements 408). For each play of the enhanced RTP mode, one or more symbol display positions 404 are replaced with a wild. In some embodiments, these wild elements appear before the spin begins, but after the player has initiated the spin. In other embodiments, the wild elements appear after the spin has been initiated (while the reels are still spinning or after they are stopped). For each play of the enhanced RTP mode, the number of wild symbols being added may be randomly determined, selected from a weighted table, or may be predetermined.

In some embodiments, the game controller 202 evaluates the plurality of symbol display positions 404 based on the number of symbols appearing in the play area of the user interface 800 to determine player awards. In other embodiments, game controller 202 evaluates the plurality of symbol display positions 404 based on one or more pay lines.

Figure 9:
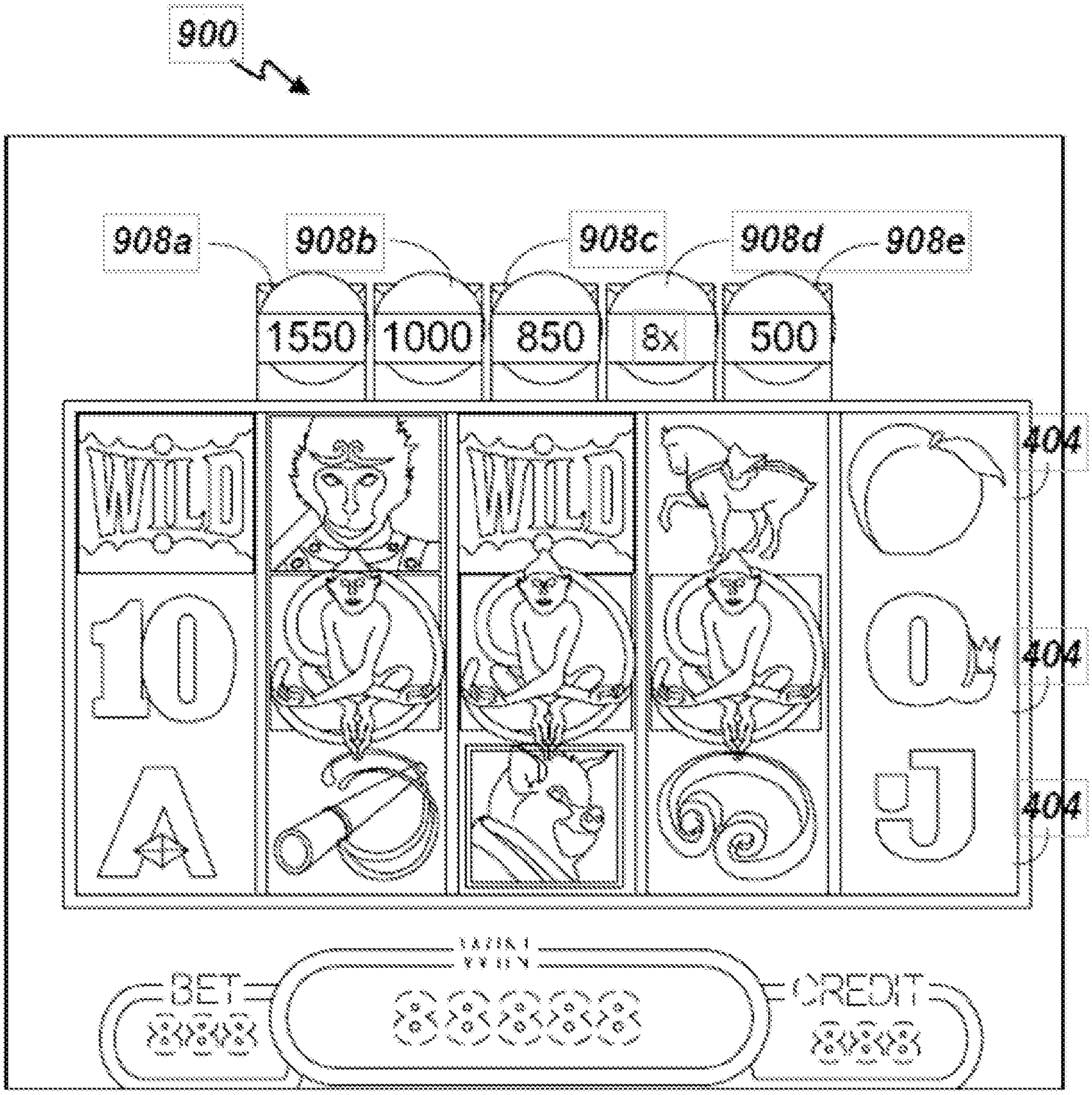
FIG. 9 illustrates another view of the user interface during a variation of the enhanced RTP mode shown in FIG. 8.

FIG. 9 illustrates a view of the user interface 900 during a variation of the enhanced RTP mode shown in FIG. 8. Each of the tracking elements 408 shown in FIG. 9 includes a value. In this embodiment, each one of those numbers represents a value, such a as a number of credits or a multiplier. During play of normal mode, tracking elements appearing in symbol display positions 404 may include numbers that represent credits or multipliers. Those numbers are then represented along with the collection elements 908*a-e*. In some embodiments, instead of numbers, there might be another modifier such as a 'free spin', 'extra wilds', etc. After all collection elements 908*a-e* have been accumulated, play of the enhanced RTP mode begins. As shown in the example of FIG. 9, during the first play of the enhanced RTP mode, collection element 908*e* is used. Collection element 908*e* corresponds to 500 credits. In some embodiments, any collection symbols that occur in the outcome for that play are substituted for a value of 500 credits. In other embodiments, 500 credits are added to any outcome and awards for that play. During the second play of the enhanced RTP mode, collection element 908*d* is used, which has a value of 8×. In certain embodiments, any collection elements (or other symbols that are designated) that occur in the outcome, are multiplied by 8× such that any awards formed using those symbols are multiplied with 8. In certain embodiments, the outcome award for that play is multiplied by 8. Play of the enhanced RTP mode continues with collection element 908*c* used next, then 908*b* and lastly 908*a*. After completion, play of the normal mode resumes.

Figure 10:
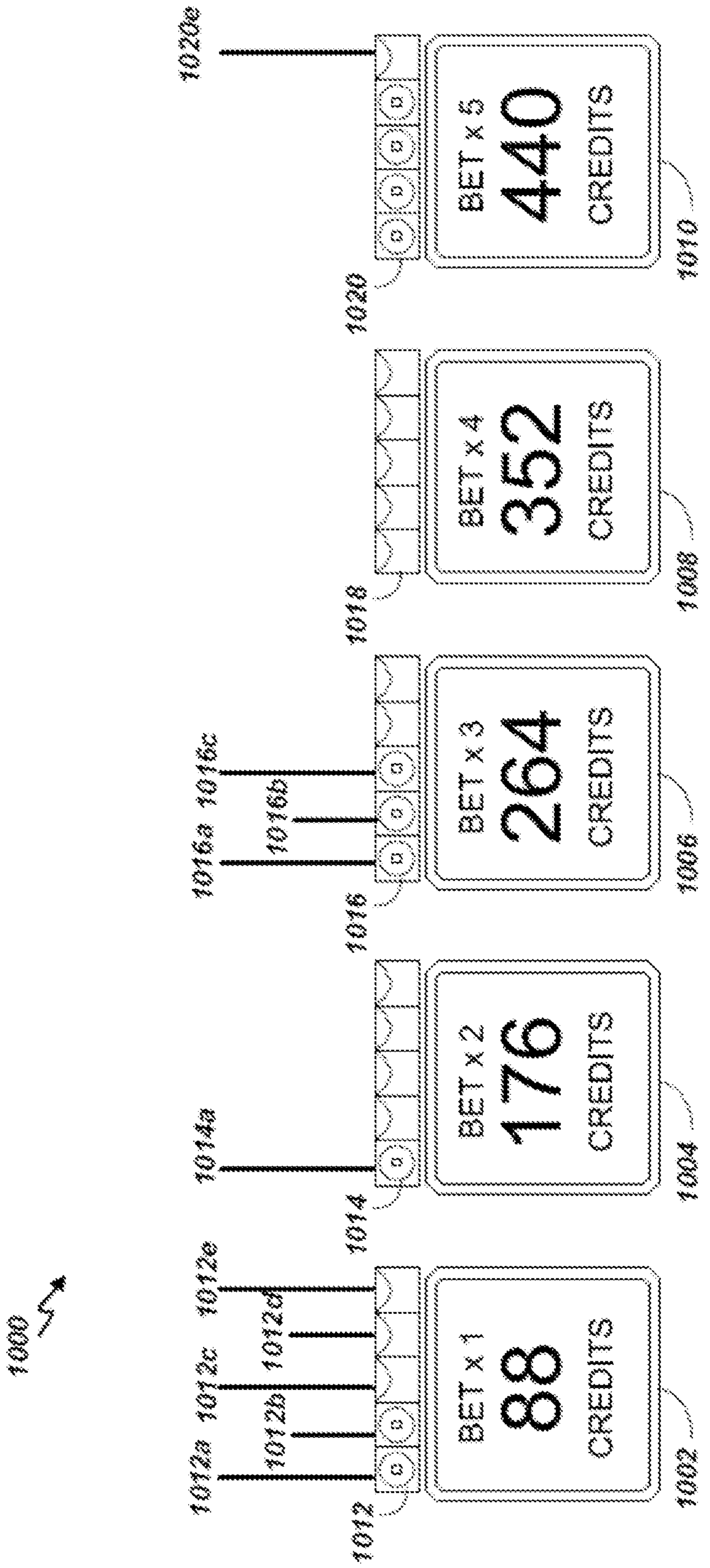
FIG. 10 displays a view of a user interface for an exemplary mode tracking system for displaying progress towards a plurality of enhanced RTP modes in accordance with at least one embodiment of the disclosure FIG. 11 displays another view of the user interface for the exemplary mode tracking system in accordance with FIG. 10.

FIG. 10 displays a view of a user interface 1000 for an exemplary mode tracking system for displaying progress towards a plurality of enhanced RTP modes in accordance with at least one embodiment of the disclosure. In the exemplary embodiment, user interface 1000 is displayed as a part of the button area or button deck 120 (shown in FIG. 1). In other embodiments, user interface 1000 is displayed on at least one of the primary game display 240 and the secondary game display 242 (both shown in FIG. 2).

In the exemplary embodiment, user interface 1000 displays the progress towards each of the levels of enhanced RTP play. Each of the plurality of input buttons 1002-1010 is associated with a different wagering level. In some embodiments, buttons 1002-1010 are similar to buttons 122 (shown in FIG. 1). In some embodiments, buttons 1002-1010 are displayed on a touch screen display and can be activated by touch. Each of the plurality of buttons 1002-1010 and their corresponding wagering level also are associated with a mode tracker 1012-1020. The mode trackers 1012-1020 include a plurality of tracking elements 1012*a-e*, 1014*a-e*, 1016 *a-e*, 1018 *a-e*, and 1020*a-e*. In the embodiment shown in FIGS. 10 and 11, the tracking elements 1012-1020 are envelopes and coins For tracking element 1012 that corresponds to an 88 credit wager (and button 1002), tracking elements 1012*a* and 1012*b* have been activated and tracking elements 1012*c-e* have not been activated yet. Each coin represents a step towards the enhanced RTP mode. At this point, the player is two of the five steps towards activating the enhanced RTP mode associated with the first wagering level. In other words, two of the elements towards enhanced RTP mode have been collected during game play over one or more game play activations, or wagers.

Figure 11:

For tracking element 1014 that corresponds to a 176 credit (and button 1004), tracking element 1014*a* have been activated and tracking elements 1014*b-e* have not been activated yet. In the exemplary embodiment as shown in FIG. 11, all five tracking elements 1020*a-e* have been collected.

In the exemplary embodiment, the progress towards activating the mode is associated with the individual gaming machine and is persistent across players. So if one player stops playing, the progress is saved by the gaming machine and the next player picks up at that point in the progression. The displays, as shown in FIGS. 10 and 11, allow players and potential player to know how far along a particular machine is towards activating each level of the mode (such as the enhanced RTP mode). This may cause players to look around at different machines to determine which machine that they want to play at based on the current progress of that machine towards one or more of the enhanced RTP modes. Furthermore, this may drive the player to play at a particular wagering level based on the gaming machines currently progress towards the enhanced RTP mode at that wagering level.

Figure 12:
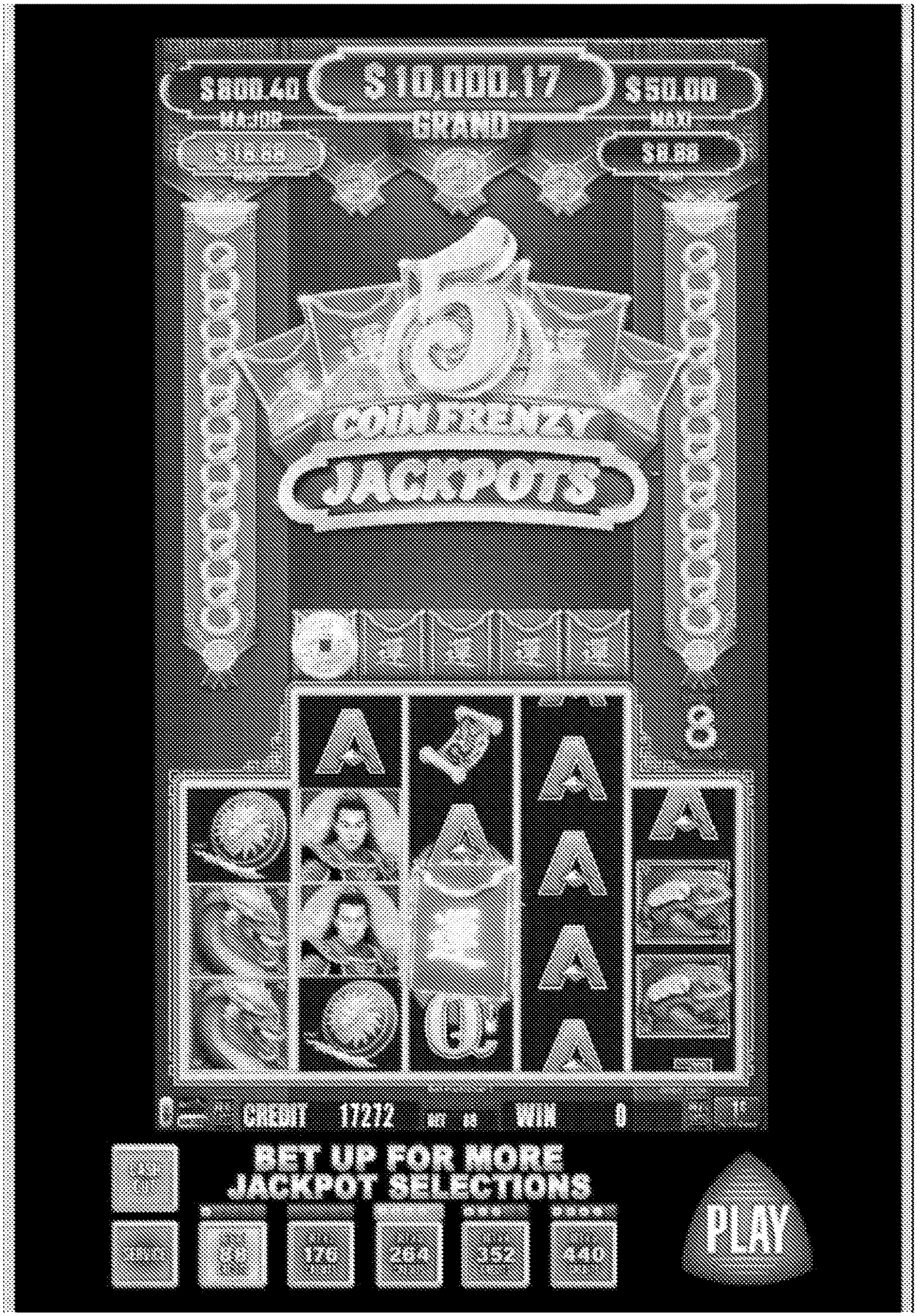
FIG. 12 displays a view of a base game for achieving an enhanced play mode, such as an enhanced RTP mode, as shown in FIGS. 4 and 5.
Figure 13:
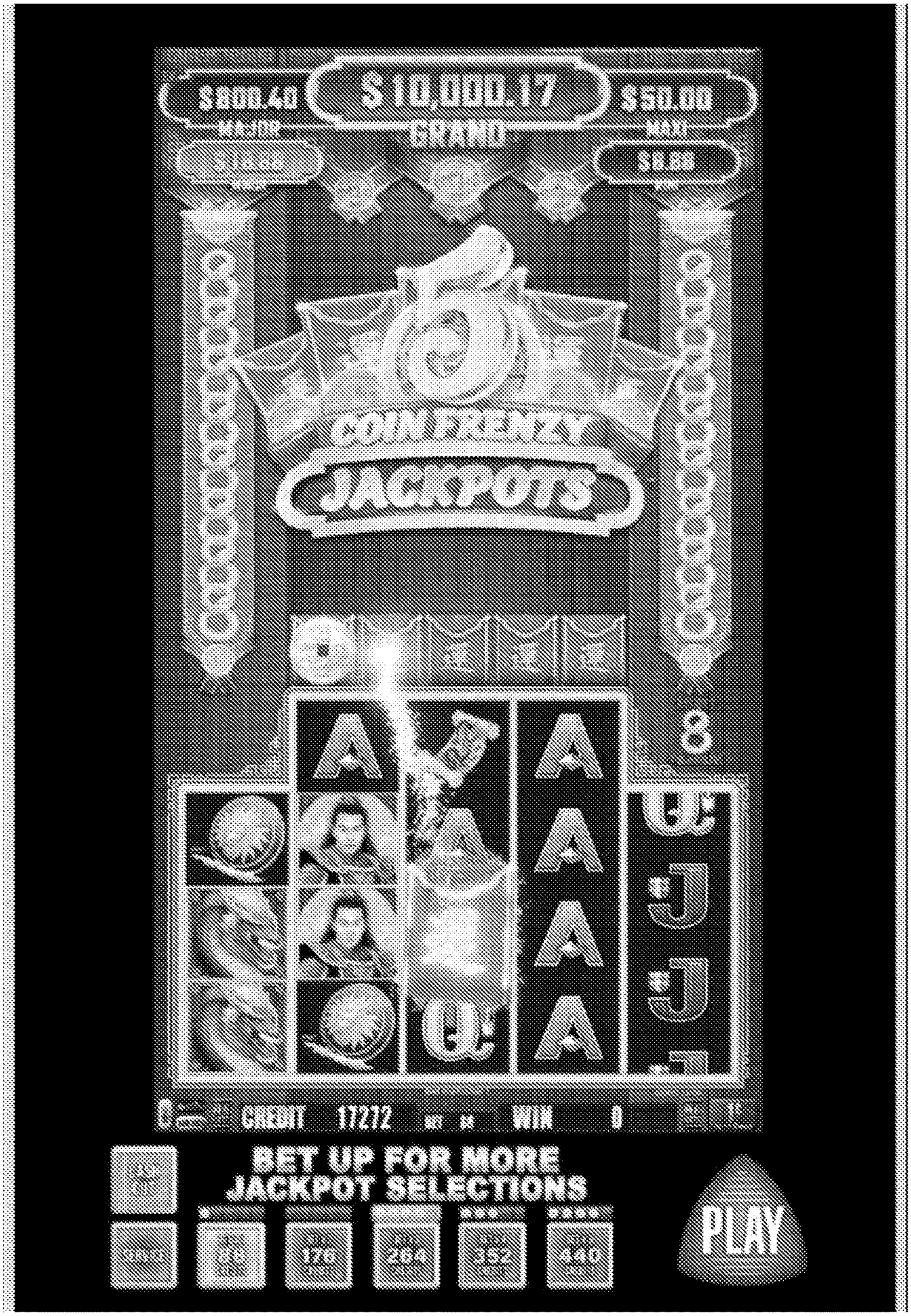
FIGS. 13-15 display a plurality of views of the base game shown in FIG. 11 progressing to the enhanced mode.
Figure 14:
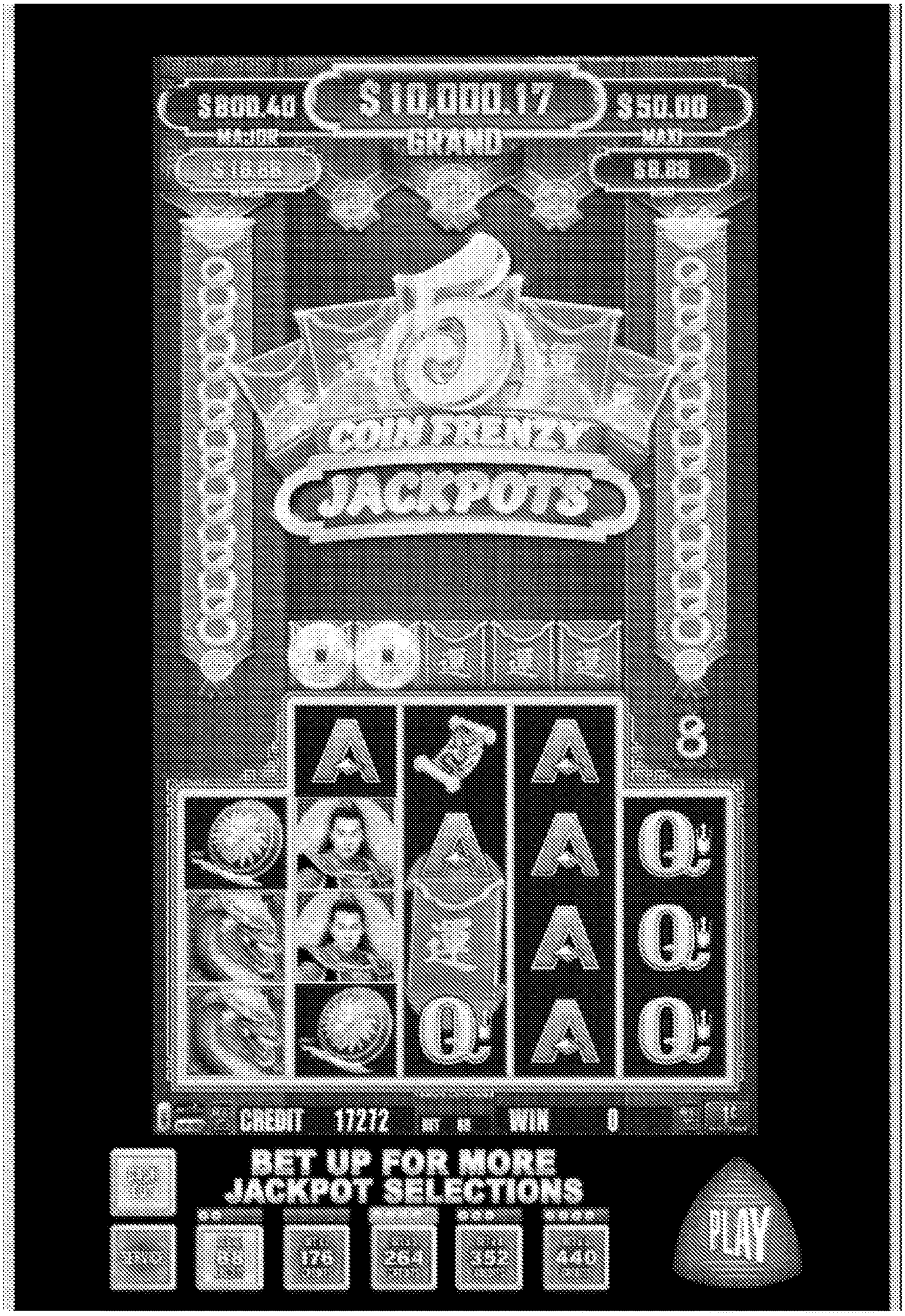
Figure 15:
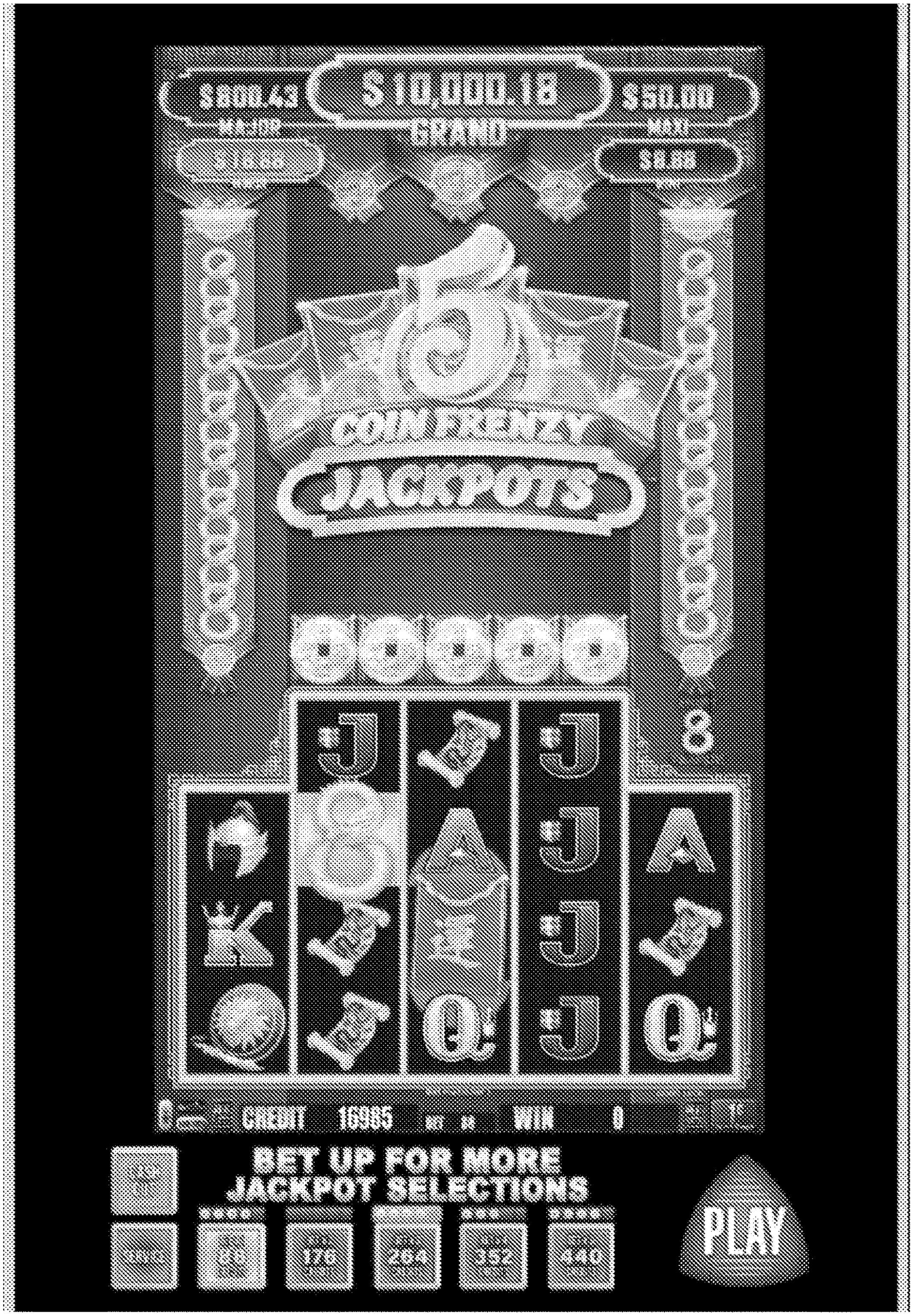

FIG. 12 displays a view of a base game for achieving an enhanced play mode, such as an enhanced RTP mode, as shown in FIGS. 4 and 5. As shown in FIG. 12, user interface 400 displays an outcome of a base game in which a red envelope symbol is displayed on reel 3. The presence of the red envelop symbol is an enhanced RTP tracking element in the outcome which activates an tracking element (element 408B of FIG. 4), as shown in FIGS. 13-14 (FIG. 13 shows an animation that indicates that a tracking element is being activated and FIG. 14 shows the activated tracking element). FIG. 15 displays a view of the base game shown in FIG. 11 progressing to the enhanced RTP mode with all tracking elements being activated.

Figure 16:
FIG. 16 displays a view of a play of a first enhanced RTP mode of the base game shown in FIGS. 12-15.

FIG. 16 displays a view of a play of a first enhanced RTP mode of the base game shown in FIGS. 12-15. As seen in FIG. 16, a user interface 600 is shown. User interface 600 is similar to user interface 600 shown in FIG. 6.

Figure 17:
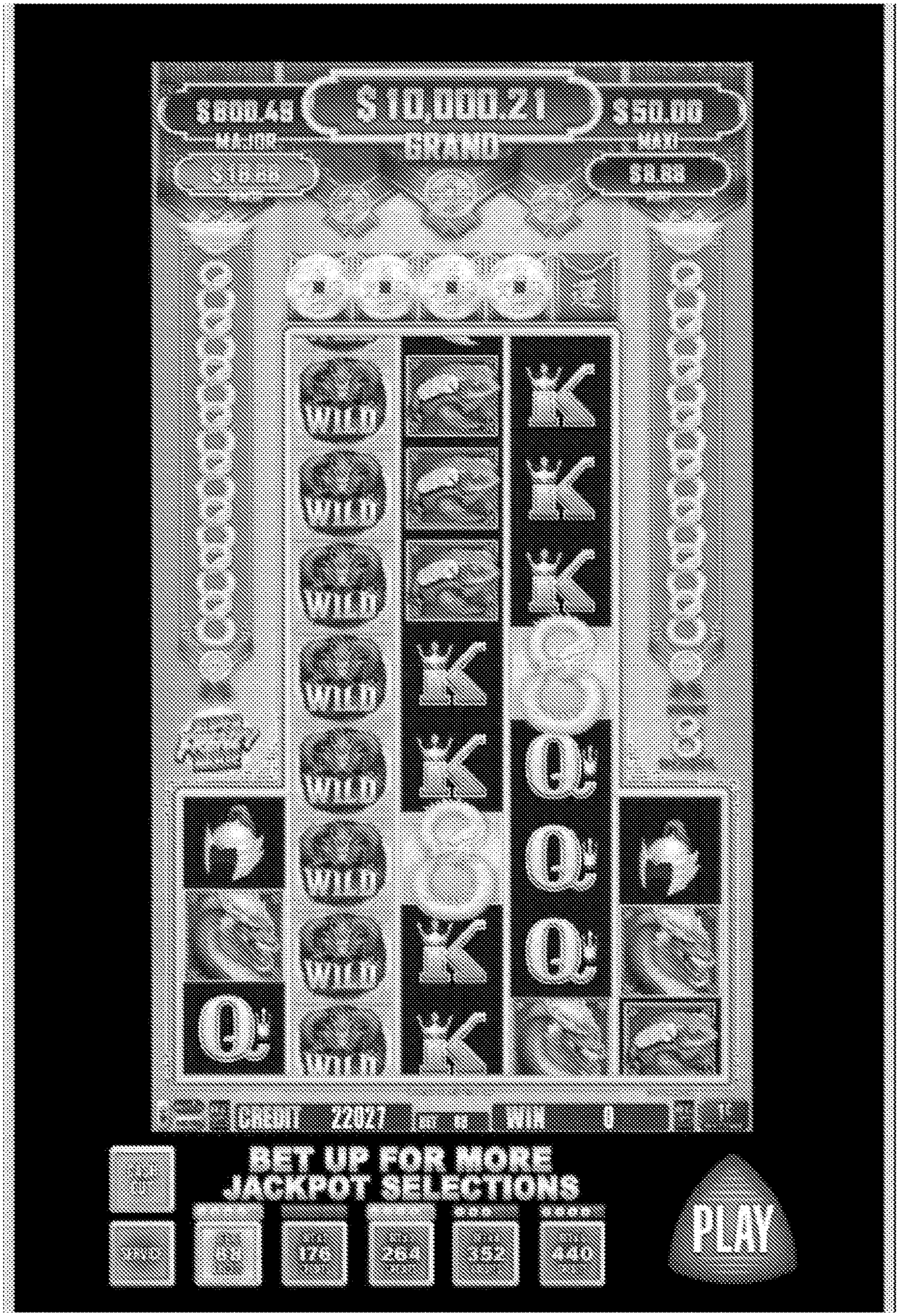
FIG. 17 displays a view of a play of a second enhanced RTP mode of the base game shown in FIGS. 12-15.

FIG. 17 displays a view of a play of a second enhanced RTP mode of the base game shown in FIGS. 12-15. As seen in FIG. 17, a user interface 700 is shown. User interface 700 is similar to user interface 700 shown in FIG. 7.

In certain embodiments, the quantity of plays of the enhanced RTP mode is based on the quantity of activated tracking elements. For example, as shown in FIGS. 6 and 7, five collected and activated tracking elements correspond to five plays in the enhanced RTP mode. In certain embodiments, the quantity of plays of the enhanced RTP mode is a multiple of the quantity of activated tracking elements. In certain embodiments, it is possible to collect additional tracking elements during the play of the enhanced RTP mode. In certain embodiments, it is possible to reset the activated tracking elements to the maximum quantity, such as five in the examples of FIGS. 6 and 7, during the play of the enhanced RTP mode. In certain embodiments, the quantity of plays of the enhanced RTP mode is randomly determined, predetermined, or player selected. In certain embodiments, a player wager amount can affect the quantity of plays of the enhanced RTP mode.

In certain embodiments, the quantity of tracking elements needed to trigger the play of the enhanced RTP mode is fixed or predetermined, such as shown in the examples of FIG. 4. In certain embodiments, the quantity of tracking elements needed to trigger the play of the enhanced RTP mode is dependent on the wager amount (higher wager amount may need a lower quantity). In certain embodiments, the occurrence of a tacking element in a game outcome can increment the activated tracking elements by one or more than one increments. This may be predetermined (certain tracking elements can increment by a quantity displayed on the tracking element), randomly determined (a display or animation to show the number of increments associated with the tracking element), player selected, determined by the play of a bonus game, such as a wheel spin, pick bonus etc.

In certain embodiments, the enhanced RTP mode can be presented in other forms. For example, instead of an increased number of rows, the enhanced RTP mode may be presented via a different set of reels that have a higher RTP. This may be via one or more of: different (higher) pays for symbol combination, higher frequency of higher paying symbols, increase in the number of (or probability of landing) special symbols such as wild symbols, increase in the number of (or probability of landing) free spin trigger symbols, etc. In certain embodiments, the enhanced RTP mode may be a different game altogether, such as a game of skill, a different game of chance, etc.

In certain embodiments, tracking elements in enhanced RTP mode tracker 406 are collected from left to right, visually, and used up, during play of the enhanced RTP mode from right to left. In certain embodiments, the quantity of plays of the enhanced RTP mode corresponds to the quantity of tracking elements. As each play commences (or ends), one tracking element is removed from the RTP mode tracker.

In certain embodiments, collected tracking elements may be saved to a player tracking account. After a player completes play of a game and leaves with certain collected but unused tracking elements, these may be saved to a player's associated account and later retrieved when the player logs in to the same or a different machine linked to the loyalty system. In some of these embodiments, after the player logs out and the tracking elements are saved to the player's account, they may not be available for any subsequent player and the count is reset of zero.

While the systems and methods describe enhanced RTP modes, these enhanced RTP modes are a part of the game being played on the EGM and have been factored in to the RTP of the associated game as a whole. That is, the overall RTP of the game (or EGM on which the game is played), is based on the RTP of the normal mode and the one or more enhanced RTP modes.

In certain embodiments, a player may choose to play the enhanced RTP mode prior to collected the required quantity of tracking elements or even after the required quantity of tracking elements are collected. In certain of these embodiments, there may not be a required quantity to collect and the player may choose at any point to trigger the enhanced RTP mode provided that the players has at least a minimum (such as one) elements accumulated. Further, the player may not be required to play all plays of the enhanced RTP mode, and may choose to return to the play of the regular base game at any point and any accumulated and unused tracking elements will continue to persist.

In certain embodiments, a player may choose to cash out accumulated tracking elements when the player wished to end their gaming session. Each accumulated tracking element may be assigned a value, that may be multiplied to the total quantity of accumulated tracking elements to determine a cash out value. This cash out value is then added to the player's credit balance.

While various embodiments have been described of the enhanced RTP mode using a slot game example, it will be apparent to those skilled in the art that the enhanced RTP mode of the present invention can be applied to any other type of game, such as a video poker game, video keno or bingo game, roulette, blackjack, baccarat, etc.

One or more of the advantages of the system described herein include, but are not limited to, a) providing visual feedback of the progress towards a specific mode; b) providing increased player engagement in progressing to specific modes; c) providing persistent progress across players towards the specific modes; d) providing enticement to play at specific wagering levels; and e) providing enticement to play a specific machine due to its current progress to a specific mode. These advantages cause a player to change or modify their normal play behavior to accommodate for these improvements. For example, a player may choose to wager a higher/lower amount if that wager amount has certain reaccumulated tracking elements from a previous play. Further, a player may choose to play for one or more additional spins if they have a certain quantity of accumulated tracking elements to try and compete the progress and trigger the enhanced RTP mode. A player may also decided to end their session early if they did not accumulate enough tracking elements.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g., an EEPROM). Further, different parts of the computer software can be executed by different devices, such as, for example, in a client-server relationship. Persons skilled in the art will appreciate that computer software provides a series of instructions executable by the processor.

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

at least one memory with instructions stored thereon; and at least one processor in communication with the at least one memory, wherein the instructions, when executed by the at least one processor, cause the at least one processor to:

cause display of a plurality of tracking display areas, wherein each tracking display area of the plurality of tracking display areas is associated with a respective input amount and a respective number of activated tracking elements;

receive a selection of a first input amount;

based on the selection, cause display of the respective number of activated tracking elements associated with the first input amount in a first tracking display area of the plurality of tracking display areas in a gameplay area for an electronic game, the first tracking display area associated with the first input amount, wherein an output is presented upon a threshold number of tracking elements being activated in the gameplay area;

determine an outcome for a play of the electronic game, wherein the outcome comprises an activation symbol;

based on the activation symbol being included in the outcome, cause activation of an additional tracking element in the gameplay area; and cause display of an animation between the activation symbol and the additional tracking element being activated.

2. The gaming device of claim 1, wherein the instructions further cause the at least one processor to determine the outcome for the play of the electronic game based on a message received from a server.

3. The gaming device of claim 1, wherein the instructions further cause the at least one processor to:

receive a second selection of a second input amount; and based on the second selection, cause display of the respective number of activated tracking elements associated with the second input amount in the gameplay area for the electronic game.

4. The gaming device of claim 1, wherein the electronic game comprises a first game mode, and wherein the instructions further cause the at least one processor to:

determine that the threshold number of tracking elements are activated; and based on the threshold number of tracking elements being activated, cause the electronic game to change from a first game mode to a second game mode, wherein changing to the second game mode comprises the output.

5. The gaming device of claim 4, wherein the first game mode comprises a first quantity of symbol positions, and wherein the second game mode comprises a second quantity of symbol positions greater than the first quantity of symbol positions.

6. The gaming device of claim 4, wherein the instructions further cause the at least one processor to, based on the threshold number of tracking elements being activated, determine the second game mode from a plurality of potential second game modes.

7. The gaming device of claim 6, wherein the instructions further cause the at least one processor to randomly determine the second game mode from the plurality of potential second game modes based on a random number generator (RNG) output.

8. At least one non-transitory computer-readable storage medium with instructions stored thereon that, in response to execution by at least one processor, cause the at least one processor to:
- cause presentation of a plurality of tracking display areas, wherein each tracking display area of the plurality of tracking display areas is associated with a respective input amount and a respective number of activated tracking elements;
- receive a selection of a first input amount;
- in response to the selection, cause presentation of the respective number of activated tracking elements associated with the first input amount in a first tracking display area of the plurality of tracking display areas in a gameplay area for an electronic game, the first tracking display area associated with the first input amount, wherein an output is presented upon a threshold number of tracking elements being activated in the gameplay area;
- determine an outcome for a play of the electronic game, wherein the outcome comprises an activation symbol;
- in response to the activation symbol being included in the outcome, cause activation of an additional tracking element in the gameplay area; and
- cause display of an animation between the activation symbol and the additional tracking element being activated.

9. The at least one non-transitory computer-readable storage medium of claim 8, wherein the instructions further cause the at least one processor to transit a message associated with the outcome to a gaming device displaying the electronic game, wherein in response to receipt of the message, the gaming device displays the outcome.

10. The at least one non-transitory computer-readable storage medium of claim 8, wherein the instructions further cause the at least one processor to:
- receive a second selection of a second input amount; and
- in response to the second selection, cause display of the respective number of activated tracking elements associated with the second input amount in the gameplay area for the electronic game.

11. The at least one non-transitory computer-readable storage medium of claim 8, wherein the instructions further cause the at least one processor to:
- determine that the threshold number of tracking elements are activated; and
- in response to the threshold number of tracking elements being activated, cause the electronic game to transition from a first game mode to a second game mode, wherein the transition to the second game mode comprises the output.

12. The at least one non-transitory computer-readable storage medium of claim 11, wherein the instructions further cause the at least one processor to, in response to the threshold number of tracking elements being activated, determine the second game mode from a plurality of potential second game modes.

13. The at least one non-transitory computer-readable storage medium of claim 12, wherein the instructions further cause the at least one processor to randomly determine the second game mode from the plurality of potential second game modes based on a random number generator (RNG) output.

14. The at least one non-transitory computer-readable storage medium of claim 8, wherein the instructions further cause the at least one processor to receive the selection in a message from a gaming device.

15. The at least one non-transitory computer-readable storage medium of claim 8, wherein the instructions further cause the at least one processor to at least one of cause presentation of the plurality of tracking display areas at a gaming device or cause presentation of the respective number of activated tracking elements associated with the first input amount in the gameplay area at the gaming device by transmitting at least one message to the gaming device.

16. A method of electronic gaming implemented by at least one processor in communication with at least one memory, the method comprising:
- generating a plurality of tracking display areas, wherein at least one tracking display area of the plurality of tracking display areas is associated with a respective input amount of a plurality of input amounts and comprises a respective quantity of tracking elements including a respective number of activated tracking elements;
- receiving a selection of a first input amount of the plurality of input amounts, wherein the first input amount is associated with a first tracking display area of the plurality of tracking display areas, the first tracking display area comprising a first respective quantity of tracking elements including a first respective number of activated tracking elements; and
- executing an electronic game with the first respective number of activated tracking elements associated with the first tracking display area, wherein an output is presented upon the first respective quantity of tracking elements being activated;
- determining an outcome for a play of the electronic game, wherein the outcome comprises an activation symbol;
- in response to the activation symbol being included in the outcome, causing activation of an additional tracking element in the gameplay area; and
- causing display of an animation between the activation symbol and the additional tracking element being activated.

17. The method of claim 16, further comprising:
- receiving a selection of a second input amount of the plurality of input amounts, wherein the second input amount is associated with a second tracking display area of the plurality of tracking display areas, the second tracking display area comprising a second respective quantity of tracking elements including a second respective number of activated tracking elements; and
- executing the electronic game with the second respective number of activated tracking elements associated with the second tracking display area, wherein an output is presented upon the second respective quantity of tracking elements being activated.

* * * * *